US008358666B2

(12) United States Patent
Ikeda

(10) Patent No.: US 8,358,666 B2
(45) Date of Patent: Jan. 22, 2013

(54) BASE STATION DEVICE, BASE STATION MANAGEMENT DEVICE AND BASE STATION MANAGEMENT SYSTEM

(75) Inventor: Eiji Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 479 days.

(21) Appl. No.: 12/361,629

(22) Filed: Jan. 29, 2009

(65) Prior Publication Data

US 2009/0279521 A1 Nov. 12, 2009

(30) Foreign Application Priority Data

May 7, 2008 (JP) ................................ 2008-120957

(51) Int. Cl.
*H04H 20/28* (2008.01)

(52) U.S. Cl. ......... 370/466; 370/328; 370/401; 370/465

(58) Field of Classification Search ........................ None
See application file for complete search history.

(56) References Cited

U.S. PATENT DOCUMENTS

| 7,453,846 | B2 * | 11/2008 | Jang | 370/329 |
|---|---|---|---|---|
| 7,649,848 | B1 * | 1/2010 | Swan et al. | 370/252 |
| 2002/0072382 | A1 * | 6/2002 | Fong et al. | 455/507 |
| 2005/0053046 | A1 | 3/2005 | Wang | |
| 2005/0174943 | A1 | 8/2005 | Wang | |
| 2006/0211447 | A1 * | 9/2006 | Purkayastha et al. | 455/552.1 |
| 2006/0245406 | A1 * | 11/2006 | Shim | 370/338 |
| 2007/0025309 | A1 | 2/2007 | Yano et al. | |
| 2007/0258414 | A1 | 11/2007 | Cheng et al. | |
| 2008/0108349 | A1 * | 5/2008 | Ihattula | 455/435.1 |

FOREIGN PATENT DOCUMENTS

| EP | 1 729 449 | 12/2006 |
|---|---|---|
| JP | 2004-23613 | 1/2004 |
| JP | 2007-36641 | 2/2007 |

OTHER PUBLICATIONS

European Search Report dated Feb. 22, 2010, from the corresponding European Application.
Trapeze Networks. "Smart Mobile: Next Generation WLAN Architecture for High Performance Networks" A Trapeze Networks White Paper, Nov. 2006, pp. 1-11, retrieved from www.trapezenetworks. com/file.cfm?content=255&pageId=38.
Colubris Networks. "Colubris TriPlane Architecture: Unprecedented WLAN Scalability" The Intelligent Wireless Networking Choice, Jun. 17, 2006, pp. 1-10, retrieved from http://www.moonblinkwifi. com/files/Colubris_TriPlane.pdf.
S. Govindan, et al. "Objectives for Control and Provisioning of Wireless Access Points (CAPWAP)" IETF Standard, Internet Engineering Task Force, Jul. 1, 2006.
Korean Notice of Preliminary Rejection dated Aug. 30, 2010, from the corresponding Korean Application.

* cited by examiner

*Primary Examiner* — Donald Mills
(74) *Attorney, Agent, or Firm* — Katten Muchin Rosenman LLP

(57) ABSTRACT

A base station device connected to a base station management device including: a wireless receiving unit receiving transmission data from a wireless terminal; a mode retaining unit stored with a centralized mode for setting a transmission destination of the transmission data in the base station management device, or a distributed mode for setting the transmission destination of the transmission data in none of the base station management device; and a wired transmitting unit transmitting the transmission data, wherein the wired transmitting unit, when the mode set in the mode retaining unit is the centralized mode, transmits the transmission data received from the wireless terminal to the base station management device, and, when the mode set in the mode retaining unit is the distributed mode, transmits the transmission data received from said wireless terminal toward a destination device of the transmission data.

8 Claims, 25 Drawing Sheets

FIG. 1

| MAIN VIEWPOINTS | DISTRIBUTED TYPE | CENTRALIZED TYPE |
|---|---|---|
| NETWORK CAPACITY (PERFORMANCE, ACCOMMODATION USER COUNT, ETC) | ○ | × |
| ROUTE DELAY | ○ | × |
| AGGREGATION OF FUNCTIONS (SECURITY, POSITION INFORMATION SERVICE, ETC) | × | ○ |
| IP MOBILITY | × | ○ |

FIG. 13

| ESS id | MODE INITIAL SETTING | MODE UPDATE STATUS | AUTONOMOUS OPTIMIZATION | CPU LOAD THRESHOLD VALUE (UPPER LIMIT /LOWER LIMIT) | BAND THRESHOLD VALUE (UPPER LIMIT /LOWER LIMIT) | DELAY THRESHOLD VALUE (UPPER LIMIT /LOWER LIMIT) |
|---|---|---|---|---|---|---|
| #0 | DISTRIBUTED TYPE | DISTRIBUTED TYPE | INVALID | N/A | N/A | N/A |
| #1 | CENTRALIZED TYPE | DISTRIBUTED TYPE | VALID | 80%/60% | 1Gbps/500Mbps | 100ms/50ms |
| ... | ... | ... | ... | ... | ... | ... |
| #n | DISTRIBUTED TYPE | DISTRIBUTED TYPE | INVALID | N/A | N/A | N/A |

| AP id | IP ADDRESS OF AP | SET ESS COUNT | ESS id | VARIOUS SETTINGS RELATED TO WIRELESS CHANNEL, OMITTED |
|---|---|---|---|---|
| #0 | 10.10.10.20 | 2 | #0 | OMITTED |
| | | | #1 | |
| #1 | 10.10.10.21 | 1 | #1 | OMITTED |
| ... | ... | ... | ... | |
| #n | 10.10.10.50 | 1 | #0 | OMITTED |

| SET ESS COUNT | ESS id | MODE UPDATE STATUS | VARIOUS SETTINGS RELATED TO WIRELESS CHANNEL |
|---|---|---|---|
| 2 | #0 | DISTRIBUTED TYPE | OMITTED |
| | #1 | CENTRALIZED TYPE | |

| MEASUREMENT NO. | CPU ACTIVITY RATIO | TRAFFIC DATA SIZE |
|---|---|---|
| #0 | 30% | 300Mbit |
| #1 | 10% | 100Mbit |
| #2 | 60% | 600Mbit |
| #3 | 80% | 800Mbit |
| #4 | 98% | 1Gbit |
| #5 | 98% | 1Gbit |
| #6 | 98% | 1Gbit |
| #7 | 98% | 1Gbit |
| #8 | 40% | 400Mbit |
| ... | ... | ... |
| #n | 20% | 200Mbit |

| AP id | MEASUREMENT NO. | DELAY TIME |
|---|---|---|
| #0 | #0 | 10ms |
|  | #1 | 15ms |
|  | ... | 5ms |
|  | #n | 20ms |
| ... | ... | ... |
| #n | #0 | 70ms |
|  | #1 | 120ms |
|  | ... | 110ms |
|  | #n | 150ms |

BASE STATION DEVICE, BASE STATION MANAGEMENT DEVICE AND BASE STATION MANAGEMENT SYSTEM

CROSS-REFERENCE OF RELATED APPLICATION

This application is based upon and claims the benefit of priority of the prior Japanese Patent Application No. 2008-120957, filed on May 7, 2008, the entire contents of which are incorporated herein by reference.

FIELD

The embodiment relates to a base station management system of a base station device wirelessly connected to a wireless terminal.

BACKGROUND

Over the recent years, an IP (Internet Protocol) wireless access technology as typified by a wireless LAN (Local Area Network) based on IEEE 802.11 has shown a sharp advancement. The wireless LAN (based on 802.11n etc) gains a momentum, in which a communication band thereof is as close as 100 Mbps. A large-scale system architecture using the wireless LAN spreads in enterprises, public local governments and educational facilities as well as being oriented to consumers because of ensuring a sufficient communication band and having convenience through a wireless access.

In parallel with such a large-scale system architecture, a variety of IP-based services exhibit wide spread. Especially, real-time services such as VoWLAN (Voice over Wireless LAN) designed for voice traffic via the wireless network are on the verge of becoming a mainstream, and, in addition, it is presumed that non-real-time services such as conventional Web browsing and a file transfer will increasingly rapidly become large in their traffic quantity.

It is broadly known that the wireless LAN is pursuant to the IEEE 802.11 Standard. The IEEE 802.11 Standard specifies only the access control method on the physical layer (PHY) and the MAC sublayer (MAC), in which there remains much flexibility in a system design including node allocation etc.

In terms of these properties, a wireless LAN network infrastructure at the present entails coexistence of three architectures such as a simplex AP architecture, a distributed integration architecture and a centralized integration architecture in the history of its development. Particularly, such a case increases that middle-scale through large-scale wireless LAN systems involve adopting the distributed integration architecture or the centralized integration architecture in terms of integrating-monitoring the LAN systems.

[Patent document 1] Japanese Patent Laid-Open Publication No. 2007-36641

SUMMARY

The distributed integration architecture is such a system that a WLAN SW is actually connected to respective access points APs via an IP network by use of an IP tunnel, in which only control packets in all the traffic (the control packets and data packets) are aggregated on the WLAN SW, while the data packets flow through communications directly with communication partner nodes without via the WLAN SW.

As terminals are linked directly to a subnet to which each AP is connected, the packet needs reattaching an IP address when the terminal moves extending over the subnets, and there is a possibility that the voice-based real-time services might be adversely affected.

The centralized integration architecture is a system in which the WLAN SW is actually connected to the respective APs by the IP tunnel via the IP network in the same way as in the distributed integration architecture, however, all the traffic (both of the control packets and the data packets) flows via the WLAN SW according to this method. All the data flows via the WLAN SW, with the result that performance of the whole wireless LAN is restrained depending on performance of the WLAN SW, and, in addition, futility occurs from a viewpoint of forwarding routes.

FIG. 1 is a diagram depicting a comparison between the distributed integration architecture and the centralized integration architecture. The distributed integration architecture has superiority in a network capacity (performance, an accommodation user count, etc) and in a route delay. Further, the centralized integration architecture has the superiority in aggregation of functions (security, a position information service, etc) and in IP mobility.

Wireless LAN equipment existing in the market adopts any one of these two systems or selects any one of the systems at a point of time when initial setting is done though the equipment supports the two systems. The two systems are largely different in their properties, and optimization is hard to attain in all of the services by only one system.

A first mode is a base station device connected to a base station management device comprising:
a wireless receiving unit receiving transmission data from a wireless terminal;
a mode retaining unit stored with a centralized mode for setting a transmission destination of the transmission data in the base station management device, or a distributed mode for setting the transmission destination of the transmission data in none of the base station management device; and
a wired transmitting unit transmitting the transmission data,
wherein the wired transmitting unit, when the mode set in the mode retaining unit is the centralized mode, transmits the transmission data received from the wireless terminal to the base station management device, and, when the mode set in the mode retaining unit is the distributed mode, transmits the transmission data received from said wireless terminal toward a destination device of the transmission data.

A second mode is a base station management device connected to a base station device, comprising:
a measuring unit measuring a load of a self-device;
a mode setting unit managing a mode of the base station device, i.e., a centralized mode for setting a transmission destination of transmission data in the base station device to the self-device or a distributed mode for setting the transmission destination of the transmission data in the base station device to none of the self-device, and managing a threshold value of a load of the self-device determining a change of the mode;
a determining unit determining whether the change of the mode is required or not by comparing the measured value measured by the measuring unit with the threshold value of the load of the self-device, which is managed by the mode setting unit; and
a wired transmitting unit transmitting, when the determining unit determines that the change of the mode is required, a mode setting instruction of instructing a post-changing mode to the base station.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 1 is a diagram depicting a comparison between a distributed integration architecture system and a centralized integration architecture system.

FIG. 13 is a diagram depicting an example of a structure of a mode setting table.

FIG. 14 is a diagram depicting an example of a structure of an AP setting table.

FIG. 15 is a diagram depicting an example of a structure of a mode retaining table.

FIG. 24 is a diagram depicting an example of a structure of a WLAN SW load table.

FIG. 25 is a diagram depicting an example of a structure of a delay information table.

DESCRIPTION OF EMBODIMENTS

<Architecture of Wireless LAN System>

Three architectures of a wireless LAN system will be described.

(Simplex AP Architecture)

Figure 2:
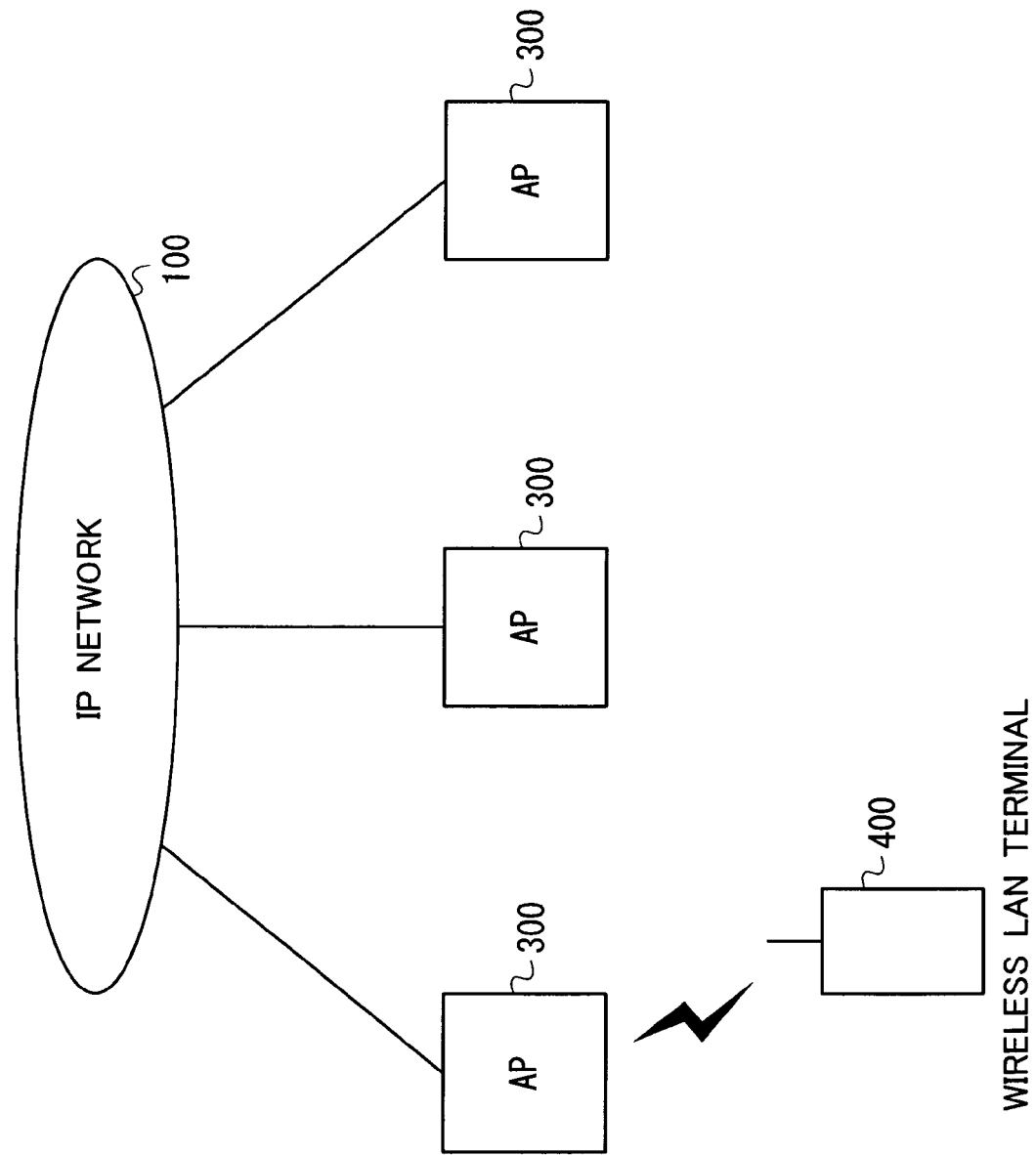
FIG. 2 is a diagram depicting an example of a configuration of a simplex AP architecture.

FIG. 2 is a diagram depicting an example of a configuration of a simplex AP (Access Point) architecture. Independent access points AP 300 are connected to an IP (Internet Protocol) network 100. A wireless LAN terminal 400 performs communications with the IP network 100 via the AP 300.

The simplex AP architecture is defined as an architecture based on a premise of only non-real-time services such as mainly Web browsing and a file transfer by way of applications of the wireless LAN. The simplex AP architecture is the most primitive system architecture in which the respective access points (APs) independently operate and connect directly with the IP network. In this configuration, the APs can not operate in a way that links up with each other, and, as the system gets upsized, it is difficult to monitor and control the whole system.

(Distributed Integration Architecture)

Figure 3:
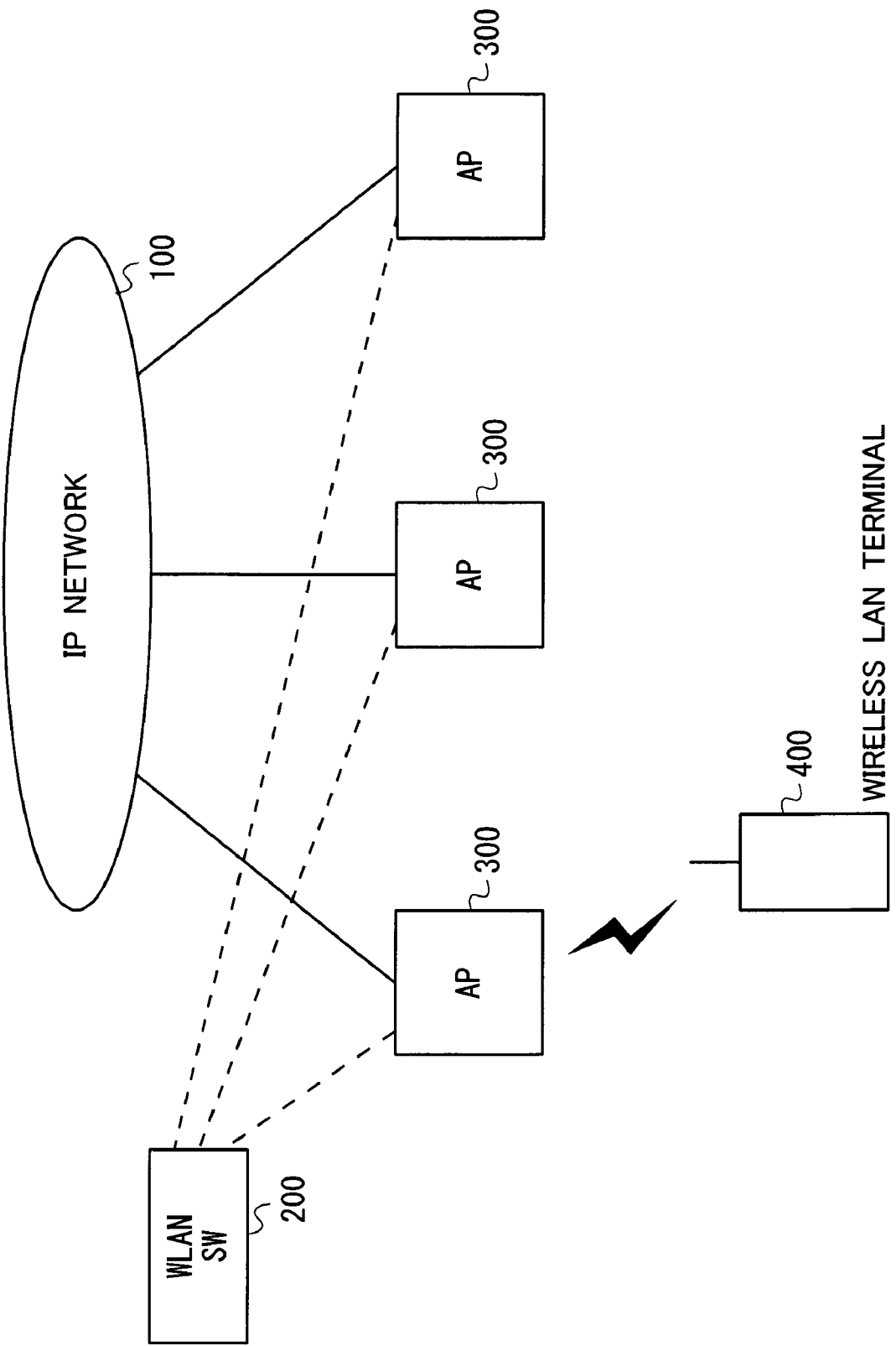
FIG. 3 is a diagram depicting an example of a configuration of a distributed integration architecture.

FIG. 3 is a view depicting an example of a configuration of a distributed integration architecture.

The distributed integration architecture is defined as an architecture for monitoring and controlling all of the APs 300 in integration with a high-order node called WLAN SW200 by introducing this WLAN SW200 for the purpose of simplification of monitoring and controlling the whole system in the simplex AP architecture. The WLAN SW200 monitors and controls the system in integration, thereby enabling the APs 300 to perform the link-up operation, a seamless handover to be conducted between the APs and the whole of wireless channels to be optimally adjusted (such as avoiding interference between neighboring channels and coverage hole). Note that the distributed integration architecture is still, in terms of the data transmission, in a status where each AP 300 transmits and receives the data directly to and from the IP network 100, while only control data is transmitted and received between WLAN SW200 and the AP 300.

Figure 4:
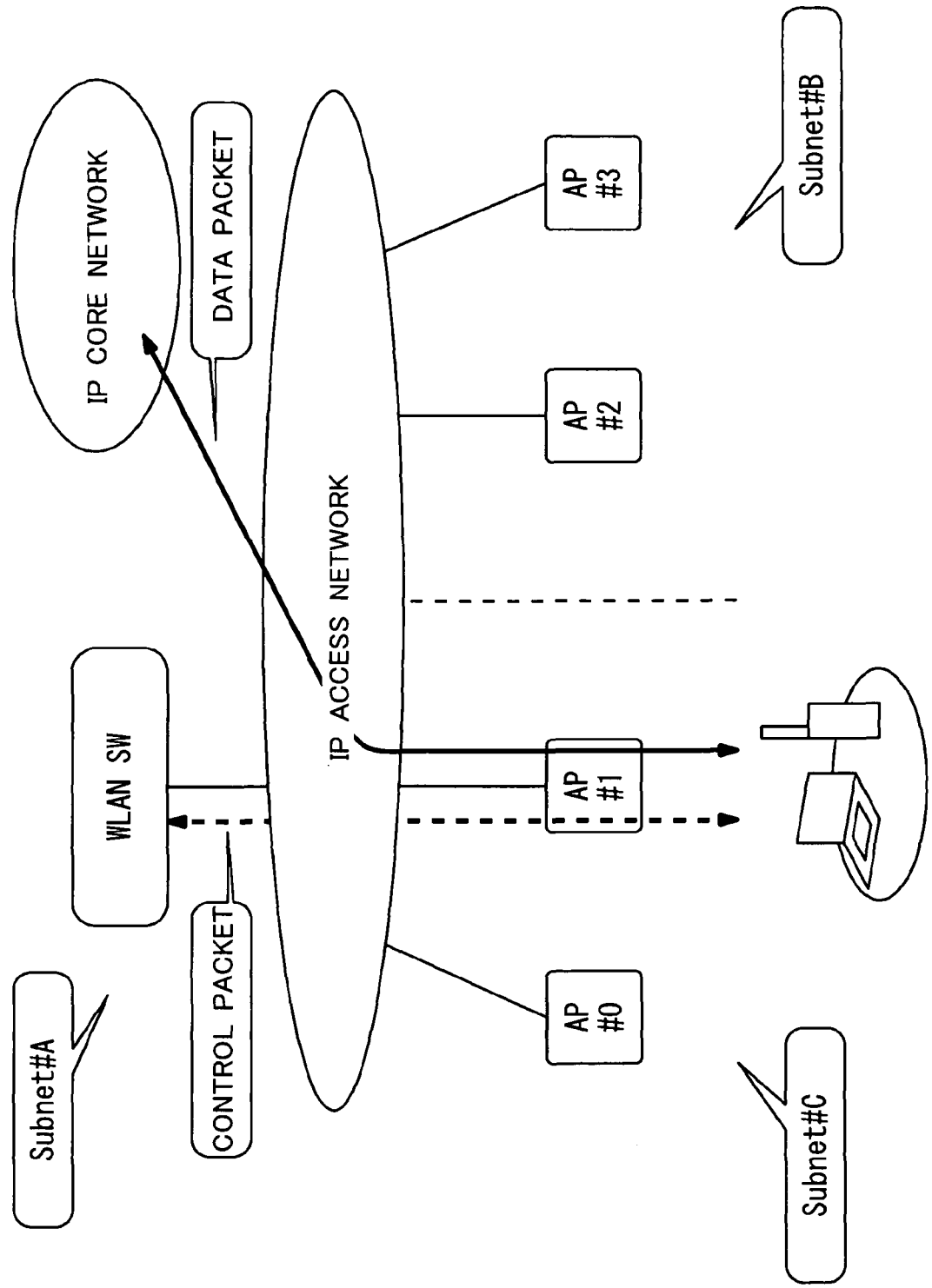
FIG. 4 is a diagram (1) depicting an example of a detailed configuration of the distributed integration architecture.
Figure 5:
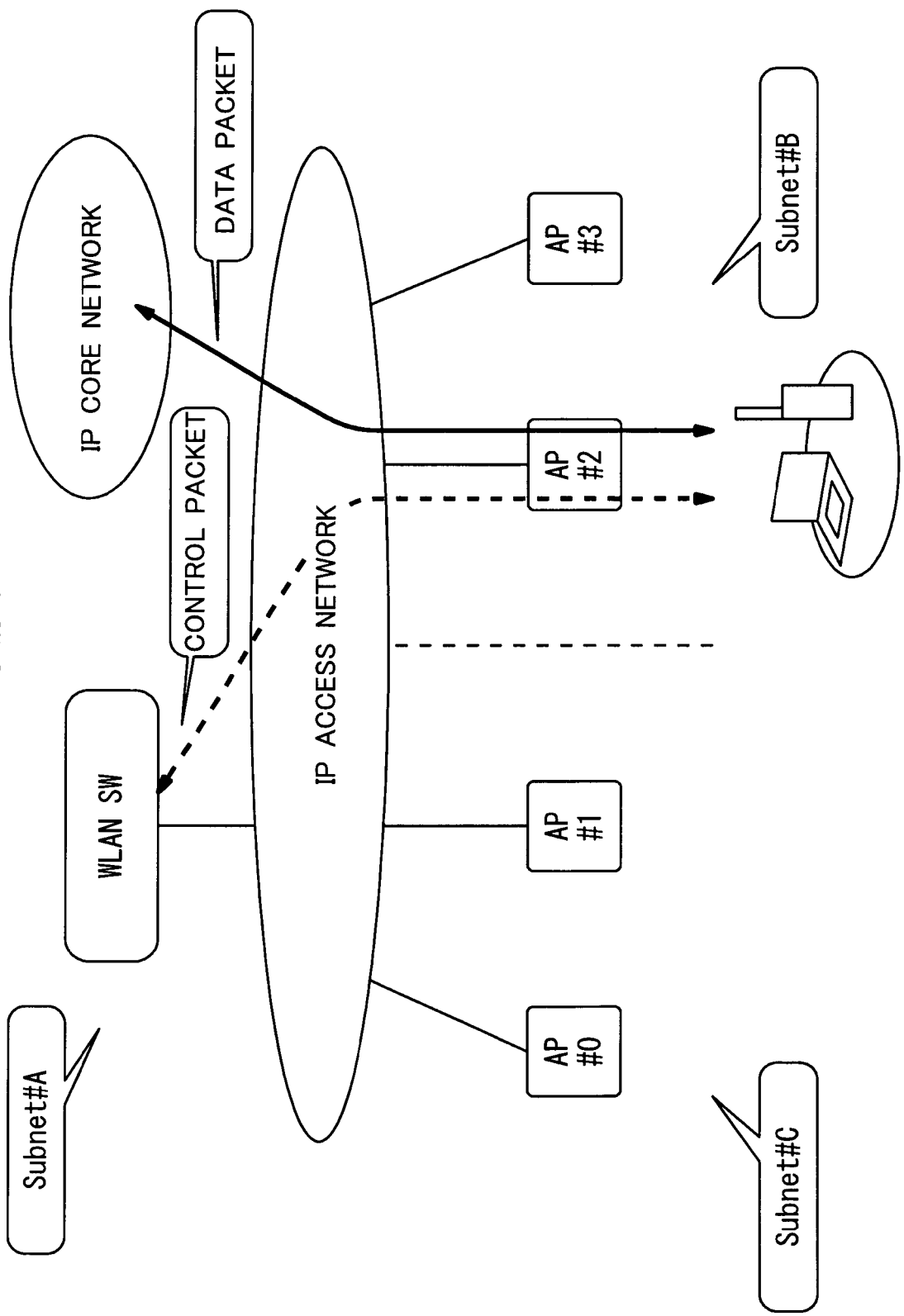
FIG. 5 is a diagram (2) depicting an example of the detailed configuration of the distributed integration architecture.

FIGS. 4 and 5 are diagrams each depicting an example of a more detailed configuration of the distributed integration architecture. The access points AP#0, AP#1, AP#2, AP#3 and the wireless LAN switch WLAN SW are connected to an IP access network. The WLAN SW exists in a subnet Subnet#A. The access points AP#2 and AP#3 exist in Subnet#B. AP#0, AP#1 exist in Subnet#C. An IP tunnel is set up between the WLAN SW and each access point AP. In the example of FIG. 4, a wireless terminal exists under the AP#1, and an IP address of Subnet#C is set in the wireless terminal. The example in FIG. 5 is that the wireless terminal exists under the AP#2, and an IP address of Subnet#B is set in the wireless terminal.

The AP forwards only a control packet from the wireless terminal to the WLAN SW, and a normal data packet is communicated directly between the AN and the IP network (the IP access network and an IP core network) without via the WLAN SW. While holding a function of unifying the monitor/control operations by terminating the control packet at the WLAN SW, only the data packet bypasses the WLAN SW, thereby enabling load concentration on the WLAN SW to be reduced. Forwarding data purely conforms to a route control function of the IP network and can be therefore forwarded via a shortest route. If the APs are located extending over a plurality of subnets, however, the IP address of the wireless terminal needs changing when taking a handover between the APs extending over the subnets. Hence, the distributed integration architecture reveals fragility with respect to continuity of a real-time service.

It is considered that a general type of data traffic such as the Web browsing and the download of a file will sharply increase from now on into the future owing to the standardization of IEEE 802.11n. The distributed integration architecture capable of increasing a network capacity is preferable for these traffics.

(Centralized Integration Architecture)

Figure 6:
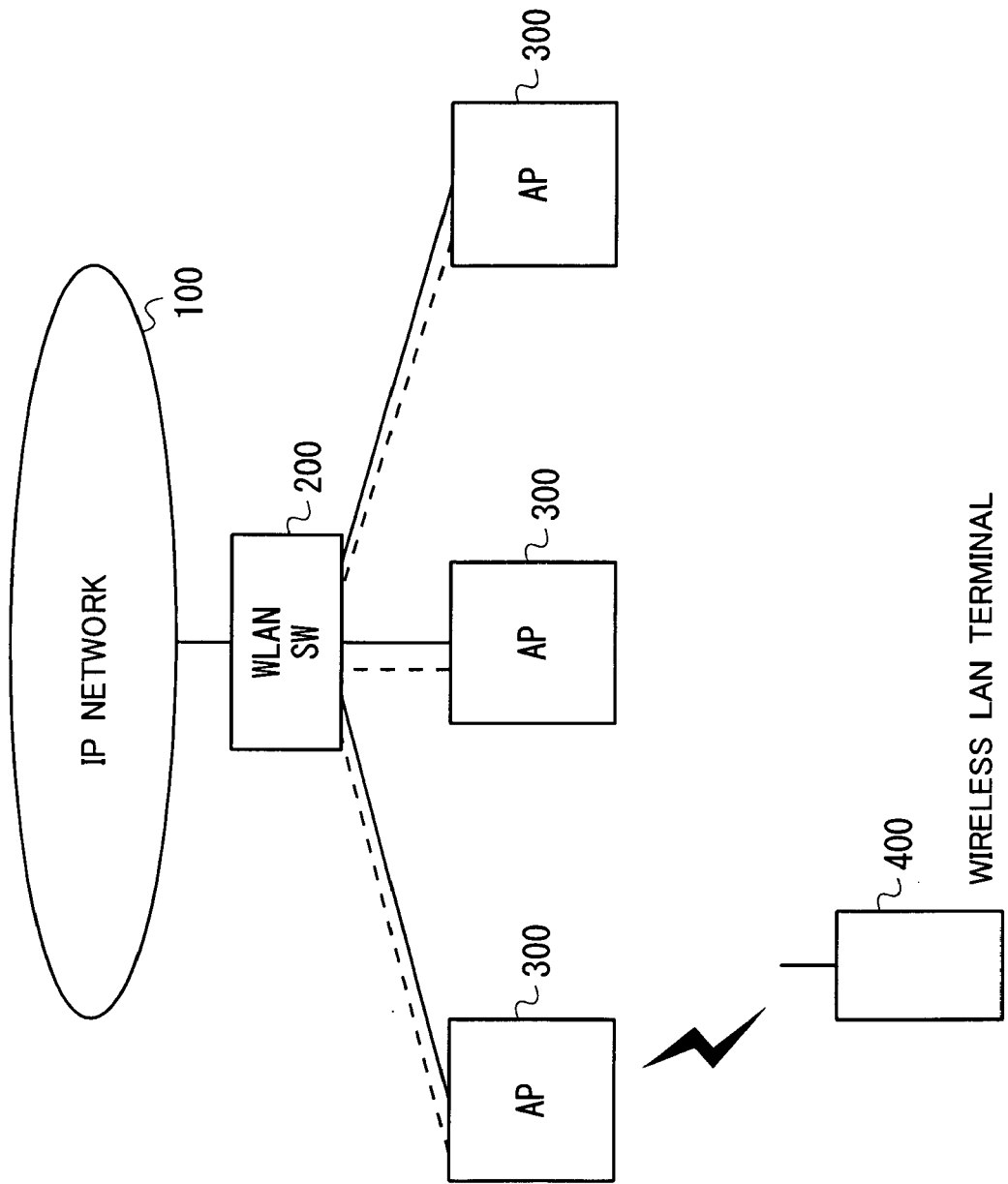
FIG. 6 is a diagram depicting an example of a configuration of a centralized integration architecture.

FIG. 6 is a diagram depicting an example of a configuration of a centralized integration architecture.

Corresponding to an increased demand for the VoIP-based real-time service as in the case of a handset, seamless mobility, i.e., the service continuity when moving between the APs gains importance. The centralized integration architecture is designed to transmit, through the WLAN SW 200, all the data via the AP 200 in a way that utilizes features of the integrated monitor/control architecture in the distributed integration architecture. With this scheme, the WLAN SW 200 becomes an anchor point for all of the services, whereby the high service continuity can be provided without depending on the subnets etc to which the AP 300 belongs.

Figure 7:
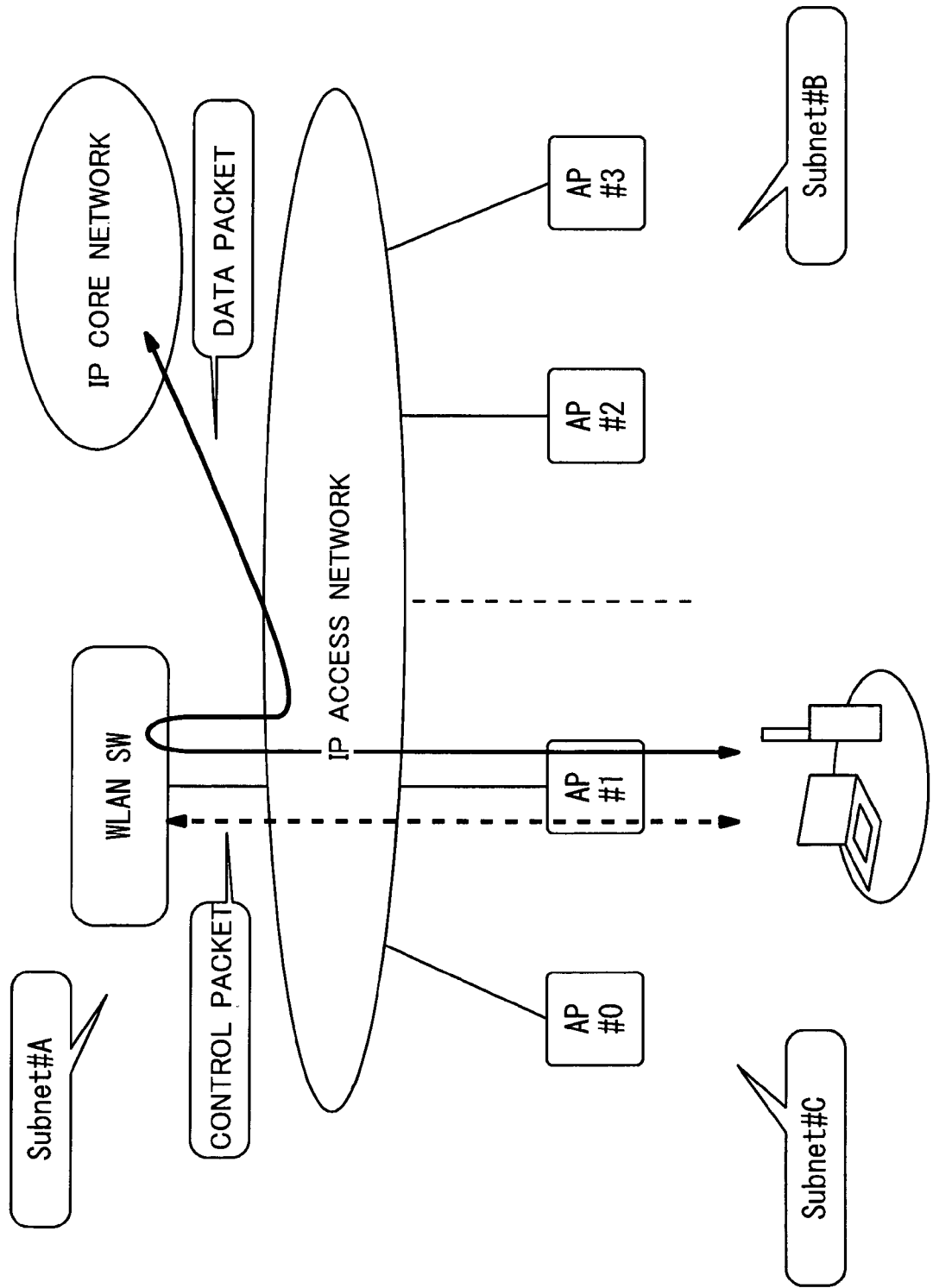
FIG. 7 is a diagram (1) depicting an example of a detailed configuration of the centralized integration architecture.
Figure 8:
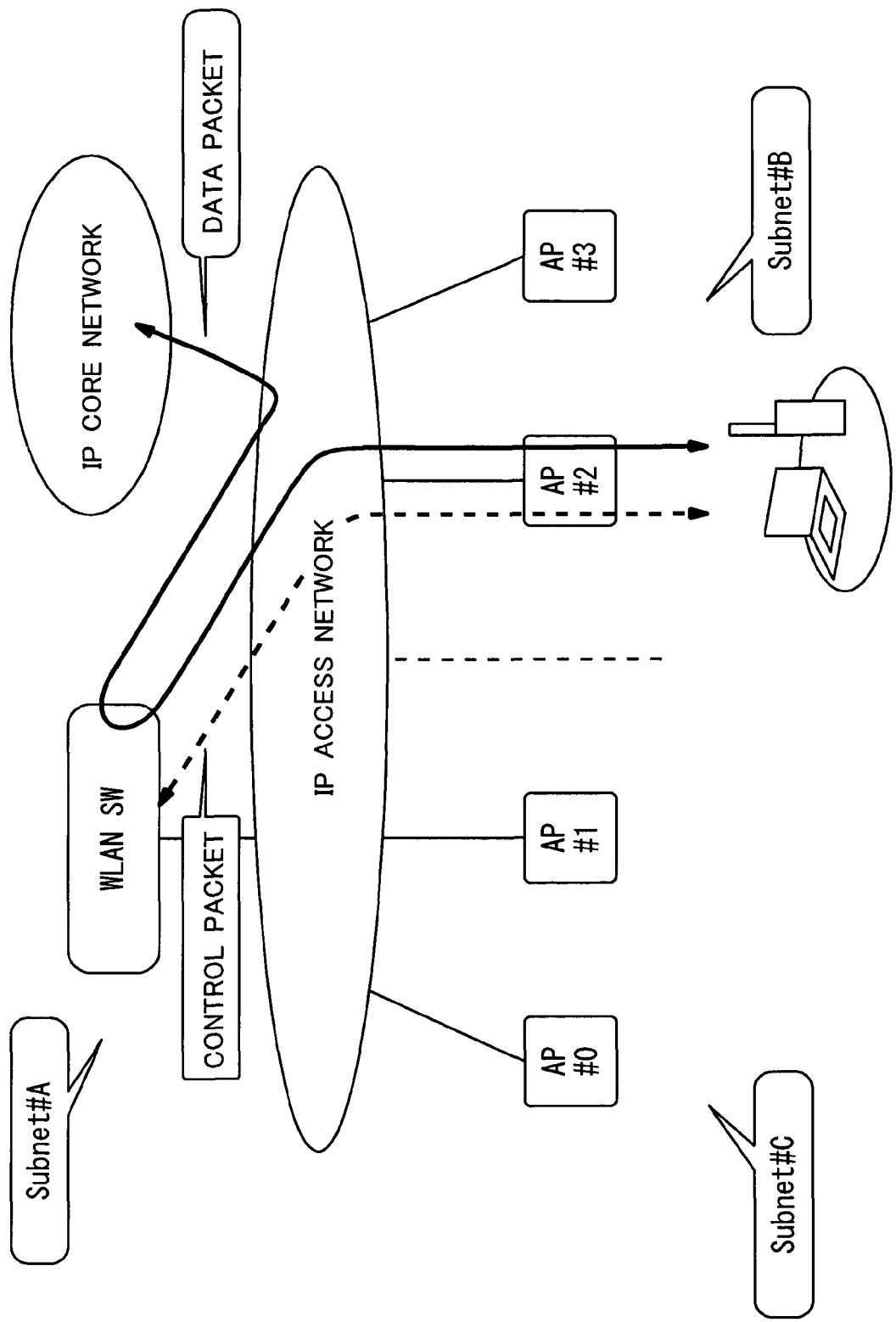
FIG. 8 is a diagram (2) depicting an example of the detailed configuration of the centralized integration architecture.

FIGS. 7 and 8 are diagrams each depicting an example of a more detailed configuration of the centralized integration architecture. The access points AP#0, AP#1, AP#2, AP#3 and the wireless LAN switch WLAN SW are connected to the IP access network. The WLAN SW exists in the subnet Subnet#A. The access points AP#2 and AP#3 exist in Subnet#B. AP#0, AP#1 exist in Subnet#C. The IP tunnel is set up between the WLAN SW and each access point AP. In the example of FIG. 7, the wireless terminal exists under the AP#1, and the IP address of Subnet#C is set in the wireless terminal. The example in FIG. 8 depicts that the wireless terminal exists under the AP#2, and the IP address of Subnet#C is set in the wireless terminal.

In the centralized integration architecture, the WLAN SW can unitarily handle all the data, and hence aggregation of security functions can be facilitated. Further, the IP address is allocated from a DHCP (Dynamic Host Configuration Protocol) server on the subnet to which the WLAN SW belongs, and, even when the terminal moves over between the subnetworks, the IP address can be continuously used, which shows the preferable service continuity. While on the other hand, all the data flows via the WLAN SW with the result that performance of the whole wireless LAN is restrained depending on performance of the WLAN SW, and futility occurs in terms of the forwarding route.

Important issues as to the VoIP on the wireless LAN are how the IP mobility is ensured and how the seamless handover is actualized, and the centralized integration architecture is preferable for these service requests.

<Configuration>

(Network Topology)

Figure 9:
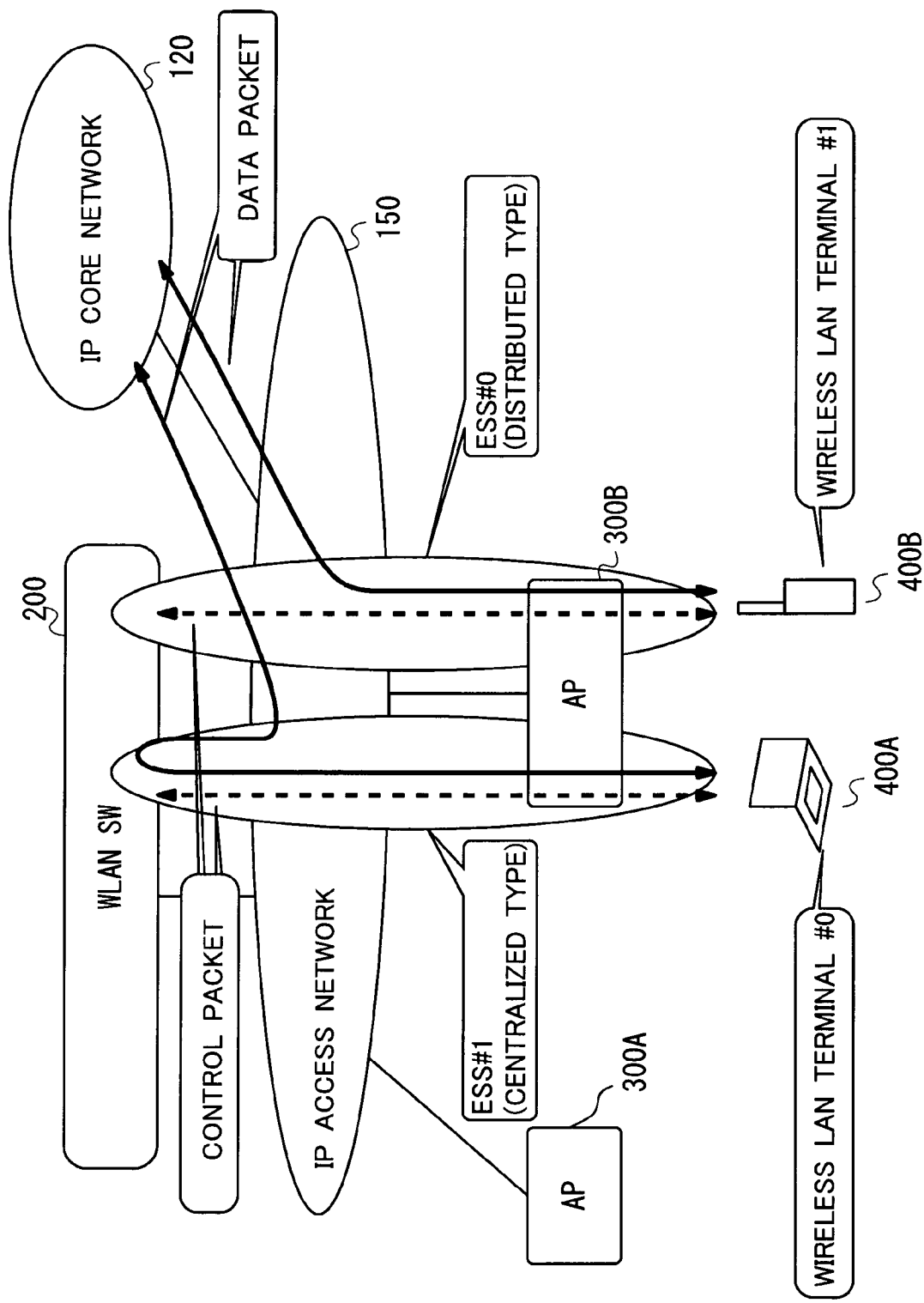
FIG. 9 is a diagram depicting an example of a network topology in the embodiment.

FIG. 9 is a diagram depicting an example of a network topology in the embodiment. The network in the embodiment includes an IP core network 120, an IP access network 150, the WLAN SW 200 connected to the IP access network, access points AP 300A, AP 300B connected to the IP access network, and wireless LAN terminals #0(400A) and #1(400B) existing in an area of the AP 300B. The access points AP 300A, AP 300B have the same function as the AP 300 has. The wireless LAN terminals #0(400A) and #1(400B) are individually simply referred to as the terminal 400A and the terminal 400B. The number of the access points APs and the number of the wireless LAN terminals are not limited to the numerical values given above. The IP network embraces the IP core network 120 and the IP access network 150.

The WLAN SW 200 administers the wireless LAN system. The WLAN SW 200 performs the communications with the wireless LAN terminal (which is simply termed the wireless terminal or the terminal) via the AP.

The AP 300A and the AP 300B perform the wireless communications directly with the wireless LAN terminals. Further, the AP 300A and the AP 300B relay the communications between the WLAN SW 200, the IP network and the wireless LAN terminal.

The wireless LAN terminal conducts the communications with the IP network via the AP and the WLAN SW 200.

The wireless LAN system enables a virtual network unit called ESS (Extended Service Set) to be defined in the wireless LAN system. Furthermore, in the wireless LAN system, a plurality of ESSs can be defined for one single wireless LAN system. This implies that a plurality of terminals connected to the same wireless channel can be grouped into some ESSs. An ESSid is an identifier for identifying the wireless network to which the wireless terminals belong.

The two ESSs such as ESS#0, ESS#1 are set in the wireless LAN system according to the embodiment. The ESS#0, ESS#1 correspond to a system of the centralized integration architecture (centralized type) and a system of the distributed integration architecture (distributed type), respectively. Moreover, the terminals 400A and the terminal 400B are preset to belong to ESS#0 and ESS#1, respectively.

Under such setting conditions, all of the data packets transmitted and received by the terminal 400A are transmission-controlled via the WLAN SW 200. On the other hand, the data packets transmitted and received by the terminal 400B are transmitted and received directly between the AP 300 and the IP core network 120 without via the WLAN SW 200.

(WLAN SW)

Figure 10:
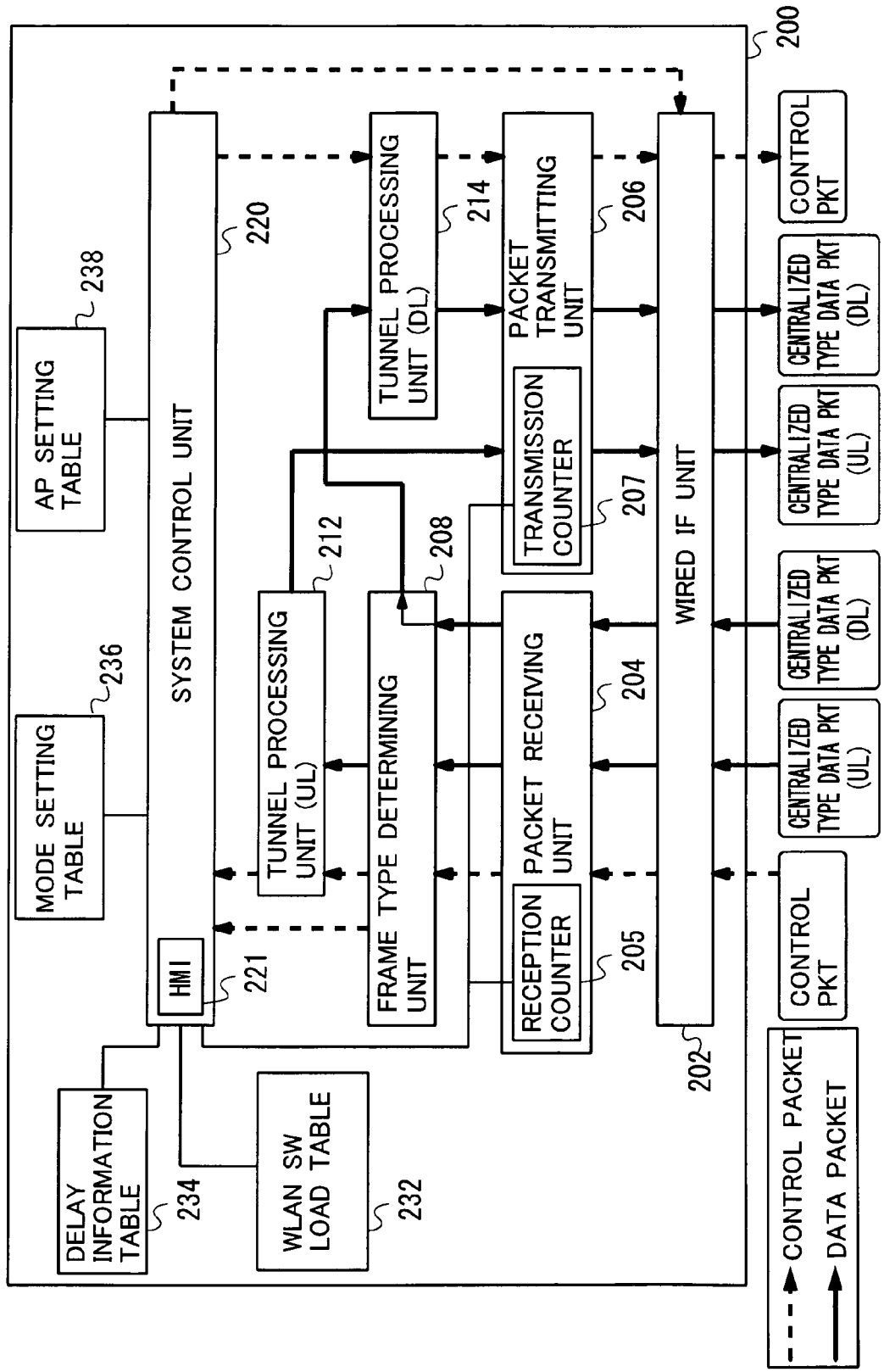
FIG. 10 is a diagram depicting an example of a configuration of a WLAN SW.

FIG. 10 is a diagram depicting an example of a configuration of the WLAN SW. The WLAN SW 200 includes a wired IF unit 202, a packet receiving unit 204, a packet transmitting unit 206, a frame type determining unit 208, a tunnel processing unit (UL) 212, a tunnel processing unit (DL) 214, a system control unit 220, a WLAN SW load table 232, a delay information table 234, a mode setting table 236, and an AP setting table 238. Among these function units, a plurality of function units may function as one single function unit. Further, one of these function units may also function as a plurality of function units. For example, the system control unit 220 may function as a measuring unit for measuring a load of the WLAN SW 200, a determining unit for determining whether a mode change is required or not, and so on.

The wired IF unit 202 is the function unit which terminates a transmitting/receiving process of the packets between an external device of the WLAN SW 200 and the wired IF unit 202 itself.

The packet receiving unit 204 is the function unit which executes protocol processes (a MAC (Media Access Control) process and an IP (Internet Protocol) process) of the packets received from the wired IF unit 202. The packet receiving unit 204 includes a reception counter 205 for counting a packet count and storing the count information.

The packet transmitting unit 206 is the function unit which executes the protocol processes (the MAC process and the IP process) necessary for the packets received from the tunnel processing unit (UL) 212 or the tunnel processing unit (DL) 214. The packet transmitting unit 206 forwards the protocol-processed data to the wired IF unit 202. The packet transmitting unit 206 includes a transmission counter 207 for counting the packet count and storing the count information.

The frame type determining unit 208 identifies a frame type by analyzing the transmission message that is protocol-processed in the packet receiving unit 204, and forwards the reception message to a proper function unit.

The frame type determining unit 208 forwards the control packet used for the control between the WLAN SW 200 and the AP 300 and the data packet (UL) in the centralized integration architecture to the tunnel processing unit (UL) 212. This is because these packets are transmitted via the IP tunnel that is set up between the WLAN SW 200 and the AP 300.

The frame type determining unit 208 forwards, directly to the system control unit 220, the packets other than the control packet used for the control between the WLAN SW 200 and the AP 300 in the control message (the control packet). These packets contain a PING packet and a control message for setting parameters given from external tools.

The frame type determining unit 208 forwards, to the tunnel processing unit (DL) 214, the data packets in the centralized integration architecture in order to transmit the data packets to the AP 300 via the IP tunnel set up between the WLAN SW 200 and the AP 300. The data packets (DL) in the centralized integration architecture are the packets transmitted from an uplink node.

The control packet used for the control between the WLAN SW 200 and the AP 300 and the data packet (UL) in the centralized integration architecture can be identified in a way that independently sets UDP Port numbers for identifying the packets transmitted via the IP tunnel set up between the WLAN SW 200 and the AP 300.

The packets other than the control packet used for the control between the WLAN SW 200 and the AP 300 can be identified by a protocol type (a protocol type "ICMP" is set in PING) and information (Telnet, HTTP (HyperText Transfer Protocol), etc)) showing a high-order application such as TCP (Transmission Control Protocol), UDP (User Datagram Protocol) Port number the IP layer.

The frame type determining unit 208, if the frame type does not come under any types, deems the packet as the data packet (DL) in the centralized integration architecture.

The tunnel processing unit (UL) 212 analyzes the tunnel protocol with respect to the message received from the frame type determining unit 208, and determines whether a content of the data transmitted based on the tunnel protocol is the control message between the WLAN SW 200 and the AP 300 or the data packet (UL) in the centralized integration architecture. If being the control message between the WLAN SW 200 and the AP 300, the tunnel processing unit (UL) 212 forwards the data to the system control unit 220. Further, if being the data packet (UL) in the centralized integration architecture, the tunnel processing unit (UL) 212 forwards the data to the packet transmitting unit 206 because of the data being forwarded as it is to the uplink node.

The tunnel processing unit (DL) 214 executes the tunnel protocol process about the data packet (DL) in the centralized integration architecture, which is forwarded from the frame type determining unit 208, or the control message between the WLAN SW 200 and the AP 300, which is forwarded from the system control unit 220, and forwards the post-protocol-processing data to the packet transmitting unit 206.

The system control unit 220 is the function unit which controls the whole wireless LAN system including the WLAN SW 200 and the AP 300. The system control unit 220 conducts the necessary control by analyzing the control message (the message transmitted from the AP 300) between the WLAN SW 200 and the AP 300, which is received from the tunnel processing unit (UL) 212. Further, the system control unit 220, if necessary for controlling the AP 300, edits the control message and forwards this message to the tunnel processing unit (DL) 214. As described above, the system control unit 220 controls the whole system and, as main functions especially in the embodiment, sets an operation mode in the AP 300 when resuming the system, collects and manages various categories of statistic information needed for determination of changing the operation mode, determines the change of the operation mode, and controls the change of the operation mode in the AP 300.

The system control unit 220 includes an HMI (Human Machine Interface) 221 and incorporates a function of terminating the transmitting/receiving function of the control message between the external setting tools and the system control unit 220 itself, and stores the set data in a corresponding table (a mode setting table 236, an AP setting table 238).

The system control unit 220 includes a delay measuring function using PING etc between the WLAN SW 200 and the AP 300, and also includes a function of storing the measurement information in the delay information table 234.

The system control unit 220 includes a function of collecting the load information of the WLAN SW 200 from the necessary function units and storing the load information in the WLAN SW load table 232. To be specific, the system control unit 220 reads the information stored in the reception counter 205 and the transmission counter 207, then properly processes the information, and stores the processed information in the WLAN SW load table 232. Further, the system control unit 220 obtains a CPU load (an activity ratio) of the WLAN SW 200 by an adequate method (the load can be obtained if hardware information, an OS function, etc are utilized) and stores the CPU load in the WLAN SW load table 232.

(AP)

Figure 11:
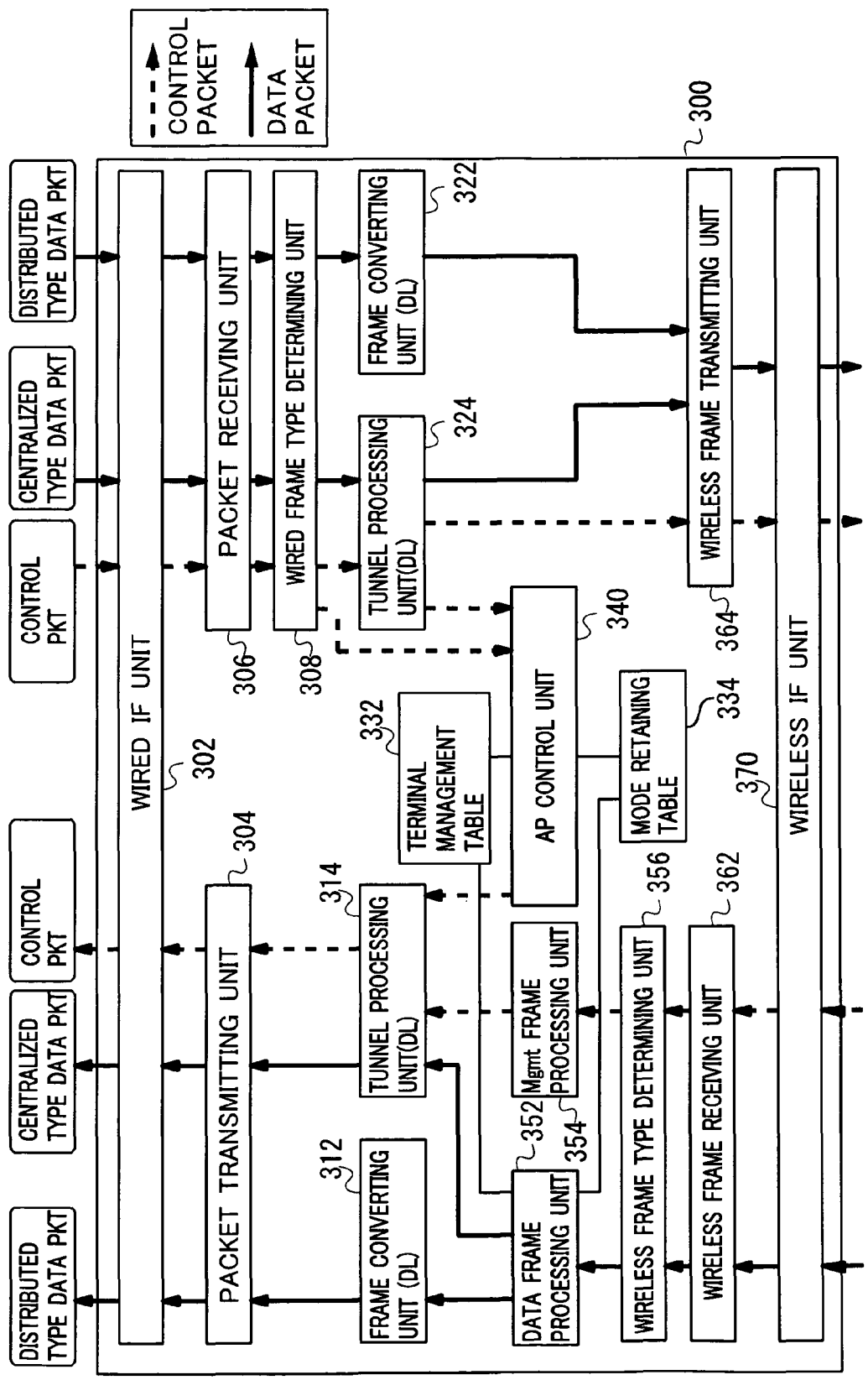
FIG. 11 is a diagram depicting an example of a configuration of an AP.

FIG. 11 is a diagram depicting an example of a configuration of the AP. The AP 300 includes a wired IF unit 302, a packet transmitting unit 304, a packet receiving unit 306, a wired frame type determining unit 308, a frame converting unit (UL) 312, a tunnel processing unit (UL) 314, a frame converting unit (DL) 322, a tunnel processing unit (DL) 324, an AP control unit 340, a data frame processing unit 352, a Mgmt (Management) frame processing unit 354, a wireless frame type determining unit 356, a wireless frame receiving unit 362, a wireless frame transmitting unit 364, and a wireless IF unit 370. The AP 300 includes a terminal management table 332 and a mode retaining table 334. Among these function units, a plurality of function units may function as one single function unit. Further, one of these function units may also function as a plurality of function units.

The wired IF unit 302 is the function unit which terminates the transmitting/receiving process of the packet between a cable network outside the AP and the wired IF unit 302 itself.

The wireless IF unit 370 includes a function of terminating the data transmission and the data reception via on the wireless channel. Specifically, the wireless IF unit 370 includes the terminating function on a physical layer according to the standard of IEEE 802.11.

The wireless frame receiving unit 362 is the function unit which executes a wireless frame protocol process such as making response confirmation (acknowledgement) of the data received from the wireless IF unit 370, and checking normality of the frame.

The wireless frame type determining unit 356 analyzes the message type from header information of the frame received from the wireless frame receiving unit 362, and forwards the received message to a proper function unit.

The wireless frame type determining unit 356, when the received frame is a Management frame (which is a wireless LAN control message specified by IEEE 802.11), forwards the frame to the Mgmt frame processing unit 354.

The wireless frame type determining unit 356, when the received frame is the data packet, forwards the frame to the data frame processing unit 352.

The Mgmt frame processing unit 354 terminates a Management frame received from the wireless frame type determining unit 356, and notifies the tunnel processing unit (UL) 314 of the control information.

The data frame processing unit 352 extracts a MAC address (i.e., the MAC address of the terminal) of a sender terminal of the data packet, which is received from the wireless frame type determining unit 356, and determines which ESS id the frame belongs to by collating the extracted MAC address with the information stored in the terminal management table 322. Further, the data frame processing unit 352 identifies which type, the distributed type or the centralized type, the operation mode of ESS id to which the frame belongs is classified as in a way that makes a collation with the mode retaining table 334. If the operation mode of ESS id to which the frame belongs is classified as the distributed type, the frame is the distributed type data packet. If the operation mode of ESS id to which the frame belongs is classified as the centralized type, the frame is the centralized type data packet.

The data frame processing unit 352, if the data packet is the distributed data packet, forwards the data to the frame converting unit (UL) 312.

The data frame processing unit 352, if the data packet is the centralized data packet, forwards the data to the tunnel processing unit (UL) 314.

The frame converting unit (UL) 312 has a necessity of forwarding the data received from the data frame processing unit 352 not to the WLAN SW 200 but directly to the IP network. Hence, the frame converting unit (UL) 312 converts a format of the data received from the data frame processing unit 352 into a frame format (which is specifically a wired MAC frame) on the occasion of the transmission to the IP network, and forwards the frame to the packet transmitting unit 304.

The tunnel processing unit (UL) 314 tunnel-protocol-processes the centralized type data packet received from the data frame processing unit 352 or the Management frame received from the Mgmt frame processing unit 354 or the control message between the WLAN SW 200 and the AP 300, which is received from the AP control unit 340, and forwards the generated data to the packet transmitting unit 304.

The packet transmitting unit 304 is the function unit which executes the necessary protocol process (the wired MAC process, the IP process) for the distributed type data packet received from the frame converting unit (UL) 312 or the centralized type data packet received from the tunnel processing unit (UL) 314 or the control packet between the WLAN SW 200 and the AP 300. The packet transmitting unit 304 forwards the protocol-processed data to the wired IF unit 302. The data is transmitted via the wired IF unit 302 to the outside of the device.

The packet receiving unit 306 is the function unit executing the protocol process (the MAC process, the IP process) for a variety of packets received from the IP network. The packet receiving unit 306 forwards the protocol-processed packet to the wired frame type determining unit 308.

The wired frame type determining unit 308 identifies the frame type by analyzing the packet that is protocol-processed in the packet transmitting unit 304, and forwards the received message to the proper function unit.

The wired frame type determining unit 308 forwards, because of being transmitted via the IP tunnel set up between the WLAN SW 200 and the AP 300, the control packet used for the control between the WLAN SW 200 and the AP 300 and the data packet in the centralized integration architecture to the tunnel processing unit (DL) 324.

The wired frame type determining unit 308 forwards, directly to the AP control unit 340, the packets other than the control packet used for the control between the WLAN SW 200 and the AP 300 in the control message. These packets include the PING packet.

The wired frame type determining unit 308 forwards, as the distributed type data packet is not transmitted based on the tunnel protocol, this data packet to the frame converting unit (DL) 322.

The UDP Port numbers used for identifying the packets transmitted via the IP tunnel set up between the WLAN SW 200 and the AP 300, are independently set in the control packet employed for the control between the WLAN SW 200 and the AP 300 and set in the centralized type data packet, thereby enabling these packets to be identified.

The packets other than the control packet used for the control between the WLAN SW 200 and the AP 300 in the control message, can be identified from the protocol type (e.g., the protocol type of PING is ICMP) on the IP layer.

The wired frame type determining unit 308 deems the packet, if the frame type does not come under any types given above, as the distributed type data packet.

The tunnel processing unit (DL) 324 analyzes the tunnel protocol with respect to the message received from the wired frame type determining unit 308, and determines which type, the control message between the WLAN SW 200 and the AP 300 or the Management frame or the centralized type data packet, the content of the data transmitted based on the tunnel protocol comes under.

The tunnel processing unit (DL) 324, if coming under the control message between the WLAN SW 200 and the AP 300, forwards this data to the AP control unit 340.

The tunnel processing unit (DL) 324, if coming under the Management frame or the centralized type data packet, forwards this data directly to the wireless LAN terminal 400, consequently executes the wireless LAN frame process for the data, and forwards the processed data to the wireless frame transmitting unit 364.

The frame converting unit (DL) 322 converts the distributed type data packet received from the wired frame type determining unit 308 into the frame format (which is specifically the IEEE 802.11 frame) on the occasion of the transmission to the wireless IF unit 370, and forwards the thus-formatted frame to the wireless frame transmitting unit 364.

The wireless frame transmitting unit 364 executes a transmission scheduling process etc for the wireless LAN frame received from the tunnel processing unit (DL) 324 or the frame converting unit (DL) 322, and forwards the processed data to the wireless IF unit 370 at a should-be-transmitting timing.

The AP control unit 340 is the function unit which controls the whole AP 300. The AP control unit 340 operates according mainly to a content of the control message between the WLAN SW 200 and the AP 300, which is received from the WLAN SW 200. In particular, the AP control unit 340 includes a function of storing the ESS information set from the WLAN SW 200, an update status (the distributed type or the centralized status) of the mode corresponding to each ESS id in the mode setting table 334. Further, the AP control unit 340 incorporates a function of setting, in the terminal management table 332, associative information between the terminal information (MAC address) of which the WLAN SW 200 notifies when establishing the connection of the wireless LAN terminal 400 and the ESS id of the ESS to which the terminal 400 belongs.

Operational Example (Resumption of System)

Figure 12:
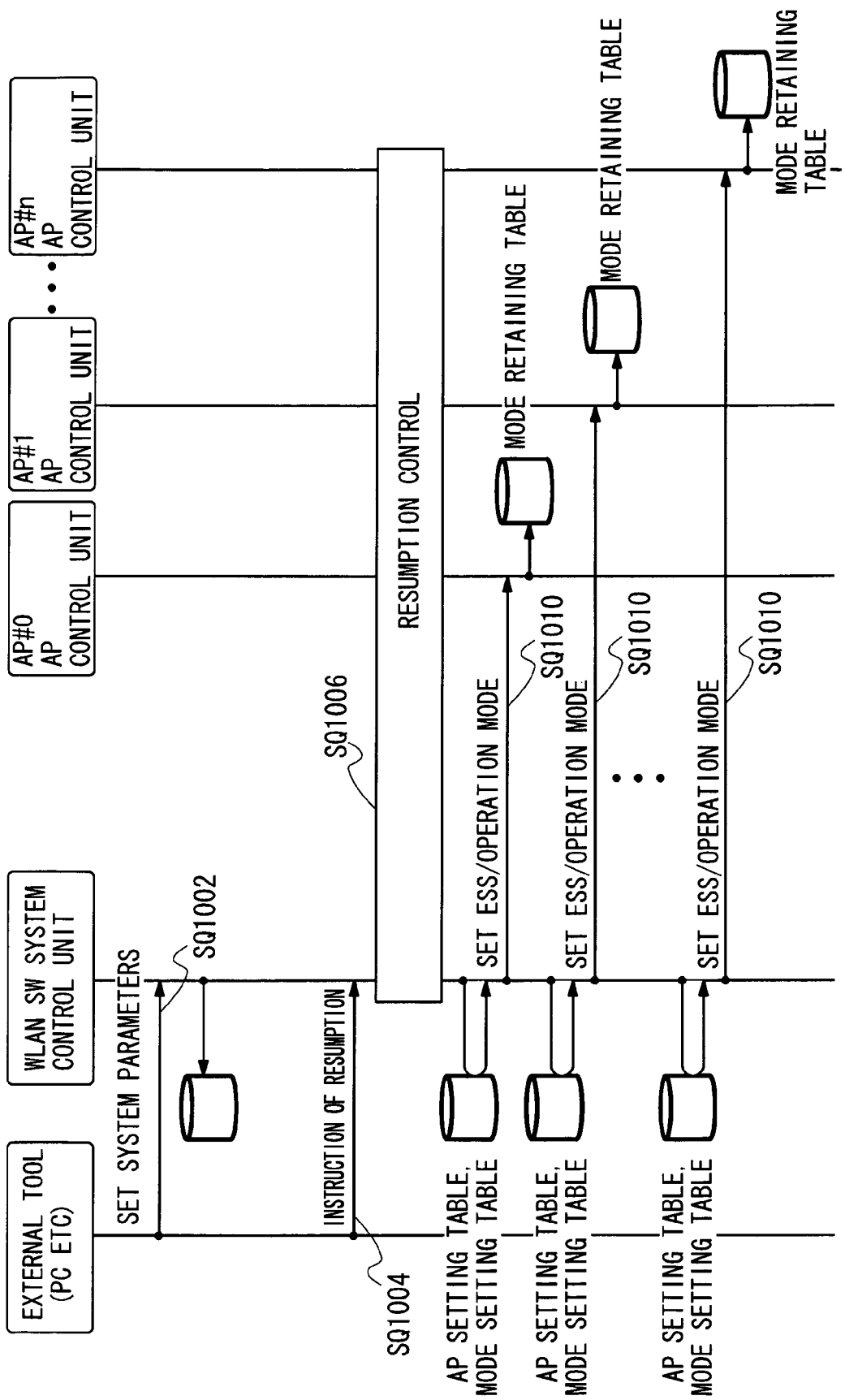
FIG. 12 is a diagram depicting an initialization sequence when resuming a system.

FIG. 12 is a diagram depicting an initialization sequence when resuming the system.

An external tool (PC etc) presets necessary parameters in the WLAN SW 200 before the system operates (SQ1002). The setting information from the external tool is received by the HMI 221 of the system control unit 220 of the WLAN SW 200, and values thereof are stored in the mode setting table 236 and the AP setting table 238.

FIG. 13 is a diagram depicting an example of a structure of the mode setting table 236. The mode setting table 236 is stored with, on an ESS id basis, items of data in a "mode initial setting" field, a "mode update status" field and valid/invalid setting of an "autonomous optimization control" field.

The "mode initial setting" field is registered with an initial value representing which mode, the distributed type mode or the centralized type mode, the system operates in when resuming the system. Further, the "mode update status" field is registered with information showing which mode, the distributed type mode or the centralized type mode, each ESS id is set in at the present. Moreover, the "autonomous optimization setting" field is registered with information showing whether or not an autonomous status shift (a change of the operation mode) is conducted between the distributed type and the centralized type, corresponding to a situation of the wireless LAN system. The mode setting table 236 is set from the external tool (the PC etc) via the HMI 221.

When "invalid" is set in the "autonomous optimization setting" field, only the operation mode specified by the mode initial setting is applied.

When "valid" is set in the "autonomous optimization control" field, items of setting information such as an upper limit threshold value and a lower threshold value of the CPU load, an upper limit threshold value and a lower threshold value of a band and an upper limit threshold value and a lower threshold value of a delay, are stored as threshold value information for conducting the optimization, wherein shift determination control of the operation mode is implemented based on comparisons between these threshold values. The upper limit threshold value and the lower limit threshold value may take the same value. Further, one threshold value may also be set in place of the upper limit threshold value and the lower limit threshold value.

FIG. 14 is a diagram depicting an example of a structure of the AP setting table 238. The AP setting table 238 is stored with, on an AP basis, an IP address of the AP, an ESS count set in the AP and pieces of ESS id corresponding to the setting ESS count. Note that the setting ESS count, the ESS id and various setting related to the wireless channel are set from the external tool via the HMI 221. Incidentally, for others, various items of setting information related to the wireless channel such as the setting of the wireless channel number can be retained in the AP setting table 238 on the AP basis.

Referring back to FIG. 12, when the external tool gives a system resuming instruction (SQ1004), the system control unit 220 of the WLAN SW 200 performs the system resuming control (SQ1006). The resuming control including the AP 300 involves using a general method in the wireless LAN system. For example, there can be adopted a method by which when resuming the system, each AP 300 automatically executes the connection process with the WLAN SW 200, and the necessary parameters are set in each AP 300 from the WLAN SW 200.

Upon completing the resuming process executed between the WLAN SW 200 and each AP 300, and, after the WLAN SW 200 and each AP 300 have come to a communication-enabled status, the system control unit 220 of the WLAN SW 200 reads the ESS information (ESS id) and the mode status (which is the information in the initial setting at this point of time) associated with the ESS id, which should be set in the AP 300 on an AP id basis stored in the AP setting table 238, and notifies the AP 300 of the associated ESS id and the mode status through the control message (the control packet) between the WLAN SW 200 and the AP 300 (SQ1010).

The AP control unit 340 of the AP 300 receives the control message between the WLAN SW 200 and the AP 300, which is transmitted by the WLAN SW 200, and stores the ESS id and the operation mode in the mode retaining table 334.

FIG. 15 is a diagram depicting an example of a structure of the mode retaining table 334. The mode retaining table 334 is stored with information corresponding to contents of the AP setting table 238 of the WLAN SW 200. The mode retaining table 334 includes a "setting ESS count" field, an "ESS id" field and a "mode update status" field. Further, the mode retaining table 334 can be also stored with the various items of setting information related to the wireless channel. The AP control unit 340 stores the values in the mode retaining table 334 in accordance with the control message given from the WLAN SW 200.

(Connection Process of Terminal to ESS id with Distributed Type Being Set, and Packet Forwarding Process)

Figure 16:
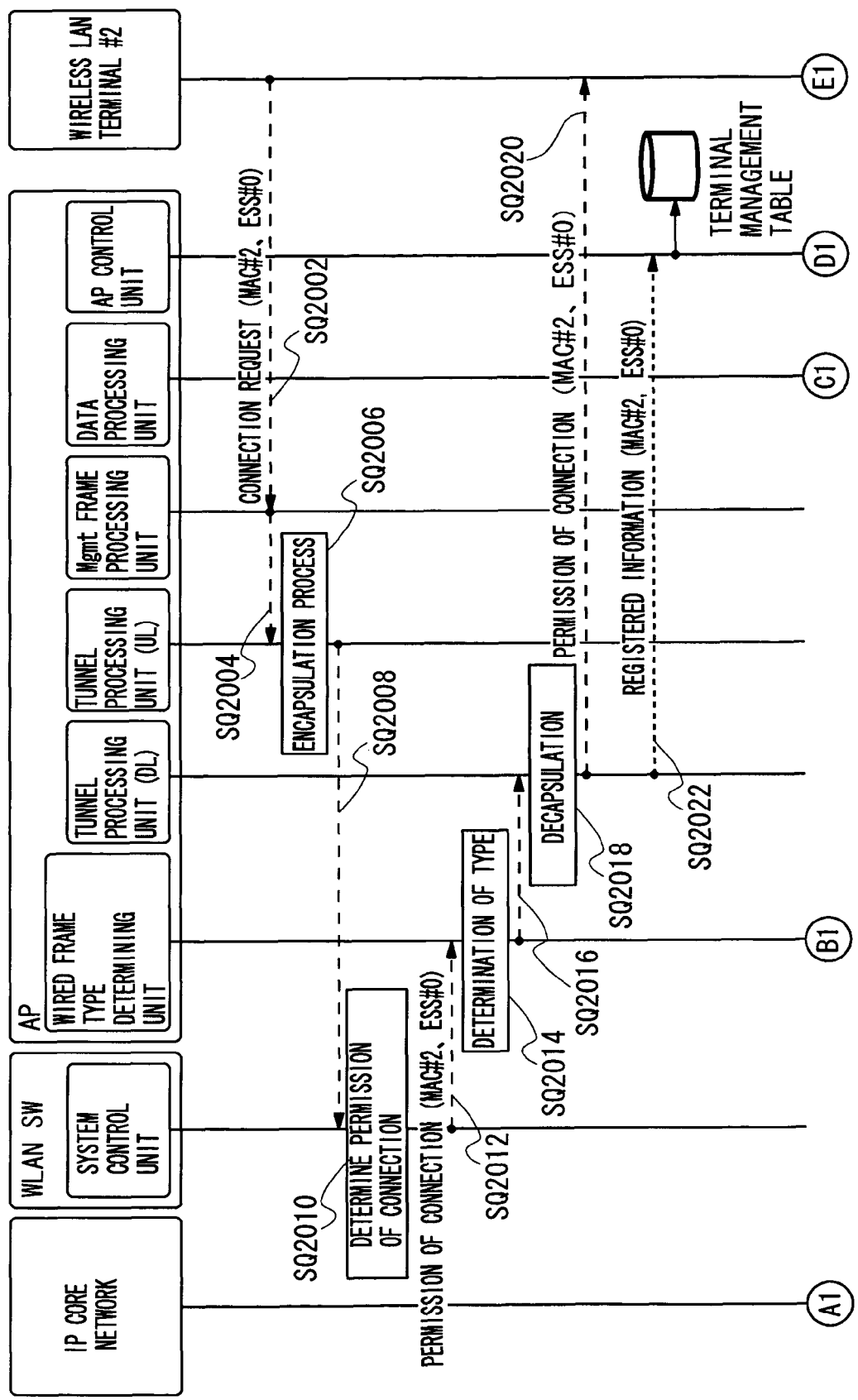
FIG. 16 is a diagram depicting an example of a sequence when a wireless LAN terminal executes a connection process to an ESS having an ESS id with a distributed type being set.
Figure 17:
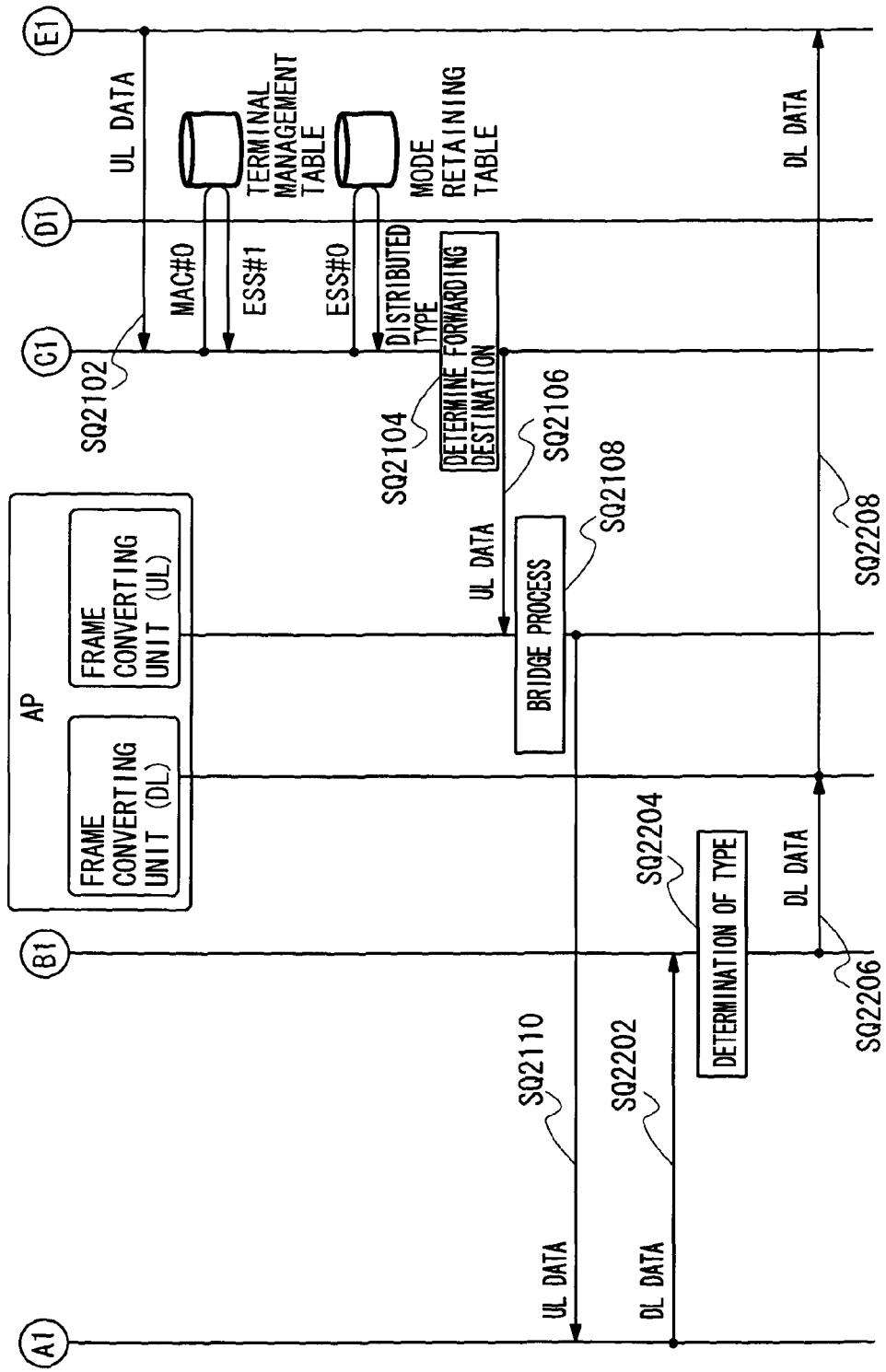
FIG. 17 is a diagram depicting an example of a sequence of a distributed type data packet forwarding process.

FIGS. 16 and 17 are diagrams depicting a sequence when the wireless LAN terminal executes a connection process to ESS id with the distributed type being set, and a sequence of a distributed type data packet forwarding process subsequent thereto. A1, B1, C1, D1, E1 in FIG. 16 connect with A1, B1, C1, D1, E1 in FIG. 17.

At first, the connection process will be described.

The wireless LAN terminal #2 (having a MAC address MAC#2) transmits a connection request message to the AP 300 (SQ2002). The connection request message is stored with the MAC address (the sender MAC address) of the wireless LAN terminal #2 and the ESS id of the ESS with which the terminal desires to connect.

The Mgmt frame processing unit 354 terminates the Management frame received from the wireless frame type determining unit 356, and notifies the tunnel processing unit (UL) 314 of the control information (SQ2004).

The tunnel processing unit (UL) 314 executes a WLAN SW 200 oriented tunnel protocol process (an encapsulation process of the Management frame) about the control information received from the Mgmt frame processing unit 354 (SQ2006). The encapsulated packet is transmitted to the WLAN SW 200 via the packet transmitting unit 304 and the wired IF unit 302 (SQ2008).

The frame type determining unit 208 of the WLAN SW 200 identifies the control message (the control packet) received from the AP 300 with the frame processed based on the tunnel protocol. The WLAN SW 200 decapsulates the control message in the tunnel processing unit (UL), then extracts the Management frame and forwards the decapsulated packet to the system control unit 220. The system control unit 220 determines from collating the variety of parameters etc whether or not the connection is permitted in response to the connection request given from the wireless LAN terminal #2 (SQ2010).

The system control unit 220, when permitting the connection, sends a connection permission message back to the wireless LAN terminal #2 via the tunnel processing unit (DL) 214, the packet transmitting unit 206 and the wired IF unit 202 (SQ2012). The connection permission message is stored with the MAC address (the destination MAC address) of the wireless LAN terminal and the ESS id of the ESS to which the wireless LAN terminal is permitted to belong.

The wired frame type determining unit 308 of the AP 300 receives the connection permission message transmitted by the WLAN SW 200 via the wired IF unit 302 and the packet receiving unit 306 of the AP 300. The wired frame type determining unit 308 identifies the message with the frame processed based on the tunnel protocol (SQ2014), and forwards the message to the tunnel processing unit (DL) 324 (SQ2016).

The tunnel processing unit (DL) 324 identifies the control message between the WLAN SW 200 and the AP 300 from the UDP Port number thereof, and forwards the message to the wireless LAN terminal via the wireless frame transmitting unit 364 (SQ2020). Further, the tunnel processing unit (DL) 324 forwards the message to the AP control unit 340 (SQ2022). The AP control unit 340 stores the terminal management table 332 with the MAC address of the wireless LAN terminal and the ESS id, which are stored in the message.

Figure 18:
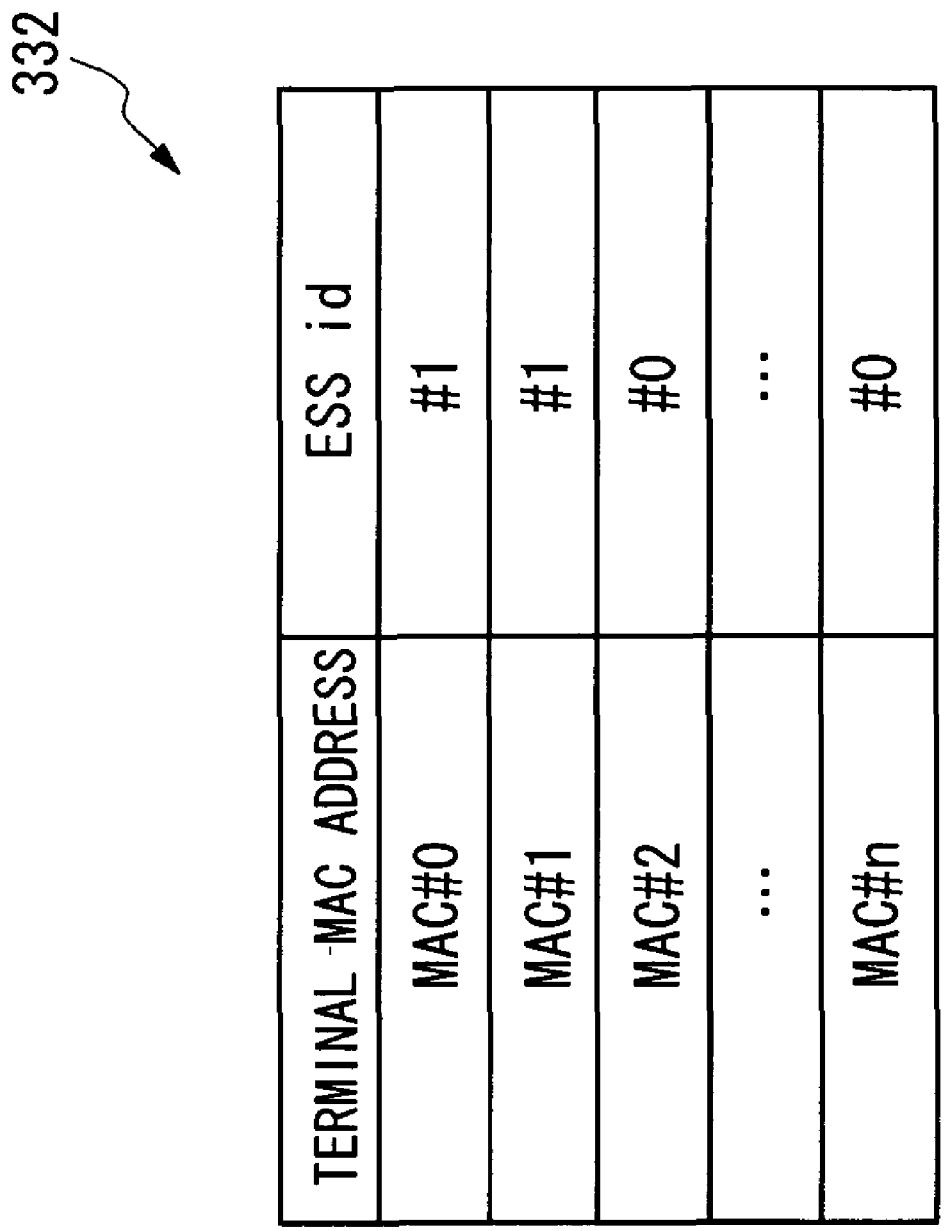
FIG. 18 is a diagram depicting an example of a structure of a terminal management table.

FIG. 18 is a diagram depicting an example of a structure of the terminal management table. The terminal management table 332 is stored with the MAC address of the terminal and the ESS id of the ESS to which the terminal belongs. The AP control unit 340 stores the terminal management table 332 with the MAC address of the terminal and the ESS id of the ESS to which the terminal belongs, which are contained in the connection permission message received from the WLAN SW 200 when controlling the terminal connection.

Next, the packet forwarding process in which to perform the data traffic after completing the connection process, will be explained. Incidentally, a premise is that the distributed type is set in the ESS (ESS id: #0) to which the wireless LAN terminal #2 belongs.

A process of the uplink data (UL data) directed to the IP core network from the wireless LAN terminal #2 will be described.

The wired frame type determining unit 308 of the AP 300 identifies the UL data received by the wireless LAN terminal #2 with the data frame. The wired frame type determining unit 308 forwards the frame to the data frame processing unit 352 (FIG. 17: S2102).

The data frame processing unit 352 extracts a source MAC address from the header information in the wireless frame of the received UL data, and refers to the terminal management table in order to search for the ESS id associated with the information (the source MAC address). The data frame processing unit 352 refers to the mode retaining table 334 to search for the operation mode associated with the searched ESS id. Through this process, the data frame processing unit 352 determines that the UL data is of the distributed type (SQ2104), and forwards the UL data to the frame converting unit (UL) 312 (SQ2106).

The frame converting unit (UL) 312 executes a bridge process (which is a conversion process from the wireless MAC frame into the wired MAC frame) (SQ2108). The frame converting unit (UL) 312 transmits the post-conversion UL data to the IP core network 120 (the device on the IP core network) via the packet transmitting unit 304 and the wired IF unit 302 (SQ2110).

A process of the downlink data (DL data) directed toward the wireless LAN terminal from the IP core network 120 (the device on the IP core network) will be explained. The routing table stored with a variety of nodes (routers and switches) existing on halfway routes is organized due to the UL data traffic described above, and hence the DL data transmitted from the IP core network is received directly the AP 300 (SQ2202).

The wired frame type determining unit 308 of the AP 300 determines a type of the DL data (SQ2204). The wired frame type determining unit 308, when determining that the DL data is the distributed type data packet, transmits the DL data to the wireless LAN terminal via the frame converting unit (DL) 322 (SQ2206, SQ2208).

(Connection Process of Terminal to ESS id with Centralized Type Being Set, and Packet Forwarding Process)

Figure 19:
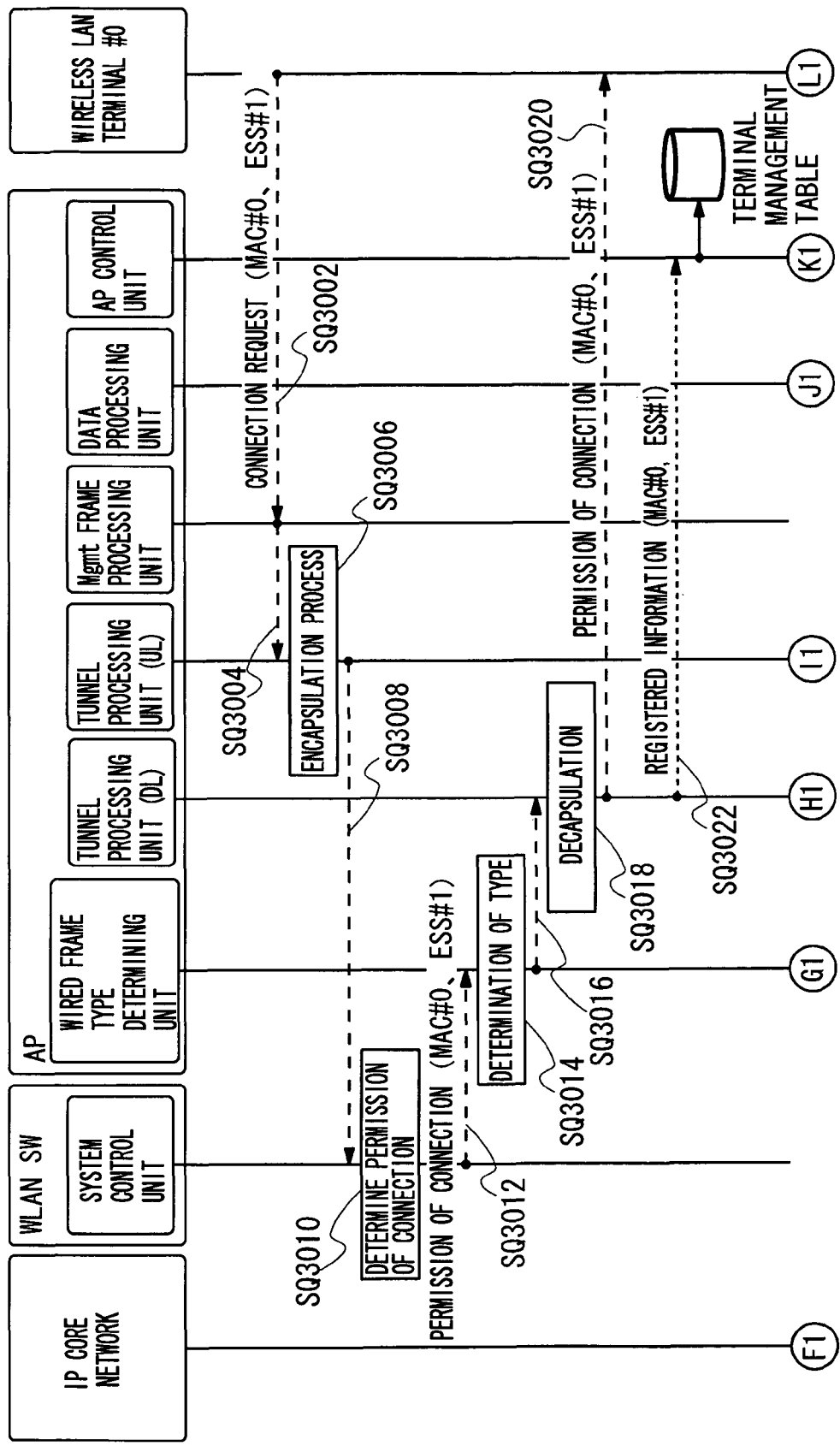
FIG. 19 is a diagram depicting an example of a sequence when the wireless LAN terminal executes the connection process to an ESS having an ESS id with a centralized type being set.
Figure 20:
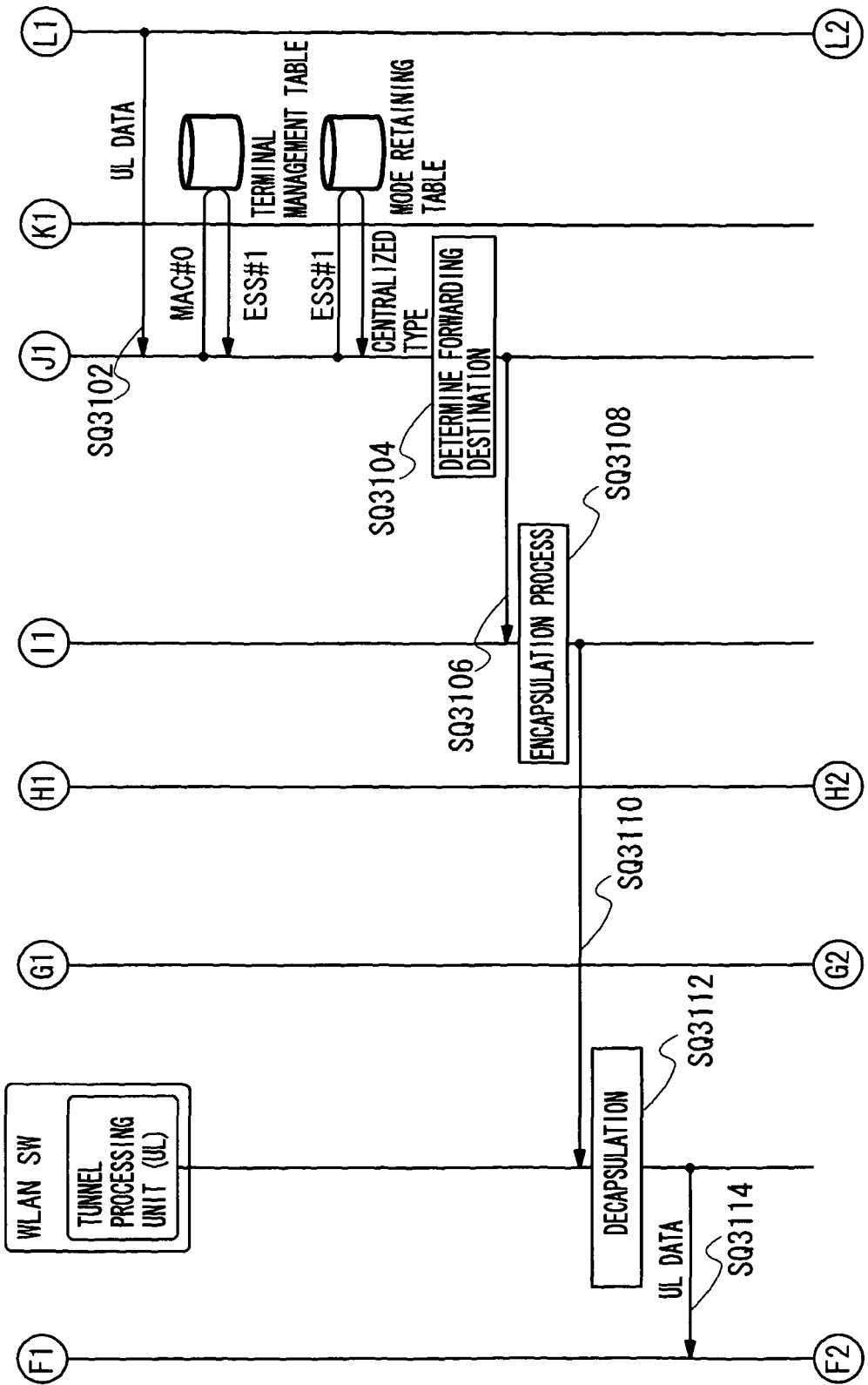
FIG. 20 is a diagram depicting an example of a sequence of a centralized type data packet forwarding process (UL).
Figure 21:
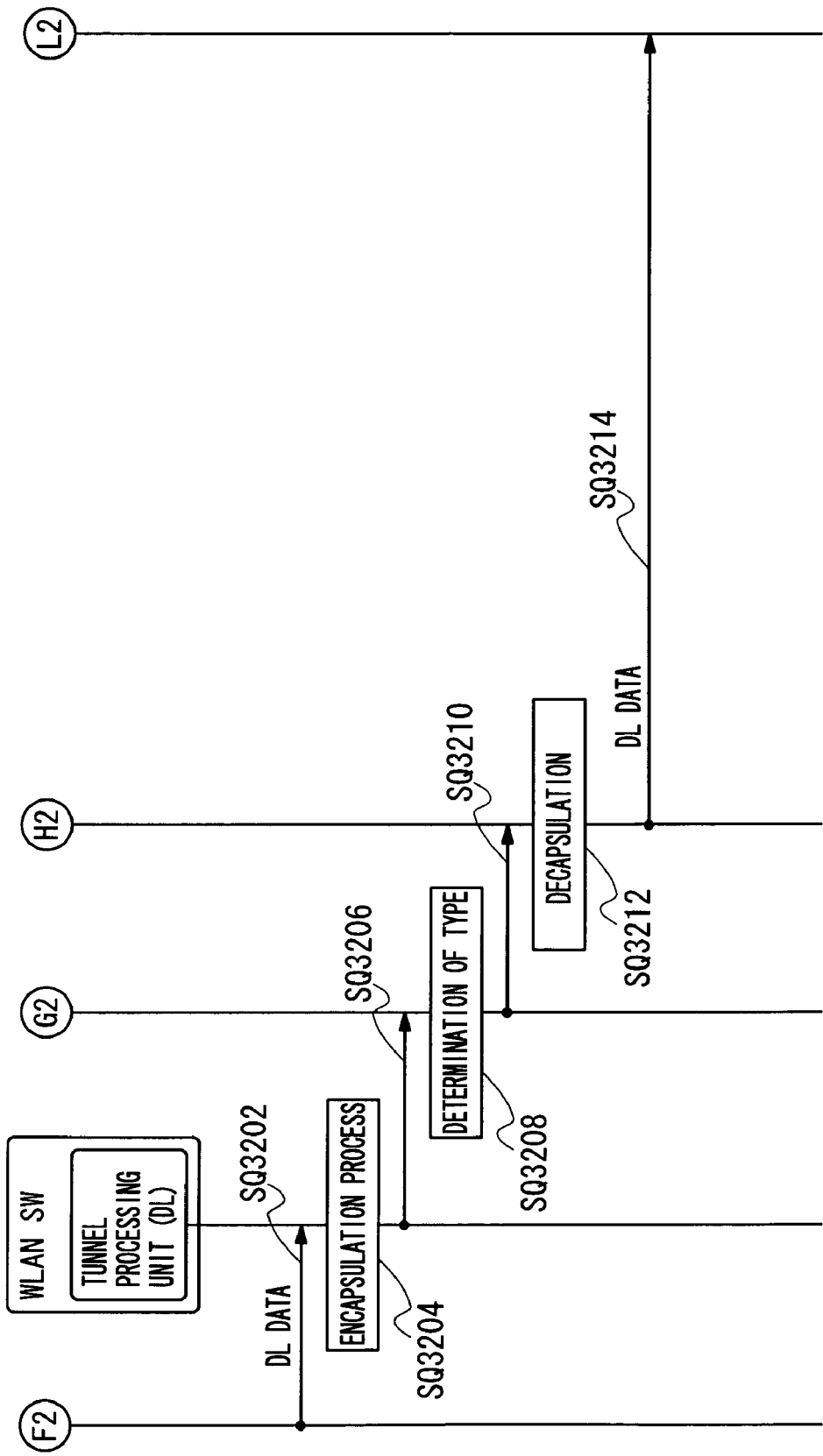
FIG. 21 is a diagram depicting an example of a sequence of the centralized type data packet forwarding process (DL).

FIGS. 19, 20 and 21 are diagrams depicting a sequence when the wireless LAN terminal executes the connection process to ESS id with the centralized type being set, and a sequence of a centralized type data packet forwarding process subsequent thereto. F1, G1, H1, I1, J1, K1, L1 in FIG. 19 connect with F1, G1, H1, I1, J1, K1, L1 in FIG. 20. F2, G2, H2, L2 in FIG. 20 connect with F2, G2, H2, L2 in FIG. 21.

At the first onset, the connection process will be explained.

The wireless LAN terminal #0 (having a MAC address MAC#0) transmits the connection request message to the AP. The connection request message is stored with the MAC address (the sender MAC address) of the wireless LAN terminal #0 and the ESS id of the ESS with which the terminal desires to connect. The wireless frame type determining unit 356 of the AP 300 determines the connection request message transmitted from the wireless LAN terminal #0 as the Management frame, and forwards the Management frame to the Mgmt frame processing unit 354 (FIG. 19: SQ3002).

Thereafter, the WLAN SW 200 makes the determination about the permission of the connection and sends the connection permission message to the wireless LAN terminal, and the AP 300 stores the terminal management table 332 with the MAC address of the wireless LAN terminal and the information on the ESS id of the ESS with which the wireless LAN terminal is permitted to connect, which operation is the same as in the processing example in FIG. 16.

Next, the packet forwarding process in which to perform the data traffic after completing the connection process, will be explained. Incidentally, a premise is that the centralized type is set in the ESS (ESS id: #1) to which the wireless LAN terminal #0 belongs.

A process of the uplink data (UL data) directed to the IP core network from the wireless LAN terminal #0 will be described.

The wired frame type determining unit 308 of the AP 300 identifies the UL data transmitted by the wireless LAN terminal #2 with the data frame. The wired frame type determining unit 308 forwards the frame to the data frame processing unit 352 (FIG. 20: S3102).

The data frame processing unit 352 extracts the source MAC address from the header information in the wireless frame of the received UL data, and refers to the terminal management table in order to search for the ESS id associated with the information (the source MAC address). The data frame processing unit 352 refers to the mode retaining table 334 to search for the operation mode associated with the searched ESS id. Through this process, the data frame processing unit 352 determines that the UL data is of the centralized type (SQ3104), and forwards the UL data to the tunnel processing unit (UL) 314 (SQ3106).

The tunnel processing unit (UL) 314, after executing the encapsulation process of the received data (SQ3108), forwards the data to the WLAN SW 200 via the packet transmitting unit 304 and the wired IF unit 302 (SQ3110).

The frame type determining unit 208 of the WLAN SW 200 identifies the frame received from the AP 300 with the centralized type data packet (UL). The frame type determining unit 208 forwards the frame to the tunnel processing unit (UL) 212. The tunnel processing unit (UL) 212 executes the decapsulation process of the received frame (SQ3112), and transmits the extracted frame to the IP core network (SQ3114).

A process of the downlink data (DL data) directed toward the wireless LAN terminal from the IP core network will be explained. The routing table stored with the variety of nodes (the routers and the switches) existing on the halfway routes is organized due to the UL data traffic described above, and hence the data transmitted from the IP core network is received directly the WLAN SW 200 (FIG. 21: SQ3202).

The frame type determining unit 208 of the WLAN SW 200 determines the type of the DL data. The frame type determining unit 208 identifies the DL data with the centralized type data packet (DL). The tunnel processing unit (DL) carries out the encapsulation process of the data frame (SQ3204). The WLAN SW 200 forwards the data frame to the AP 300 via the IP tunnel between the WLAN SW 200 and the AP 300 (SQ3206).

The wired frame type determining unit 308 of the AP 300 determines the type of the frame received from the WLAN SW 200 (SQ3208). The wired frame type determining unit 308, when identifying the frame with centralized type data PKT, forwards the frame to the tunnel processing unit (DL) 324 (SQ3210).

The tunnel processing unit (DL) 324 decapsulates the received frame (SQ3212), then generates the wireless LAN frame from the extracted data, and transmits the frame to the wireless LAN terminal via the wireless frame transmitting unit 364 and the wired IF unit 370 (SQ3214).

(Mode Change of Distributed Type and Centralized Type)

Figure 22:
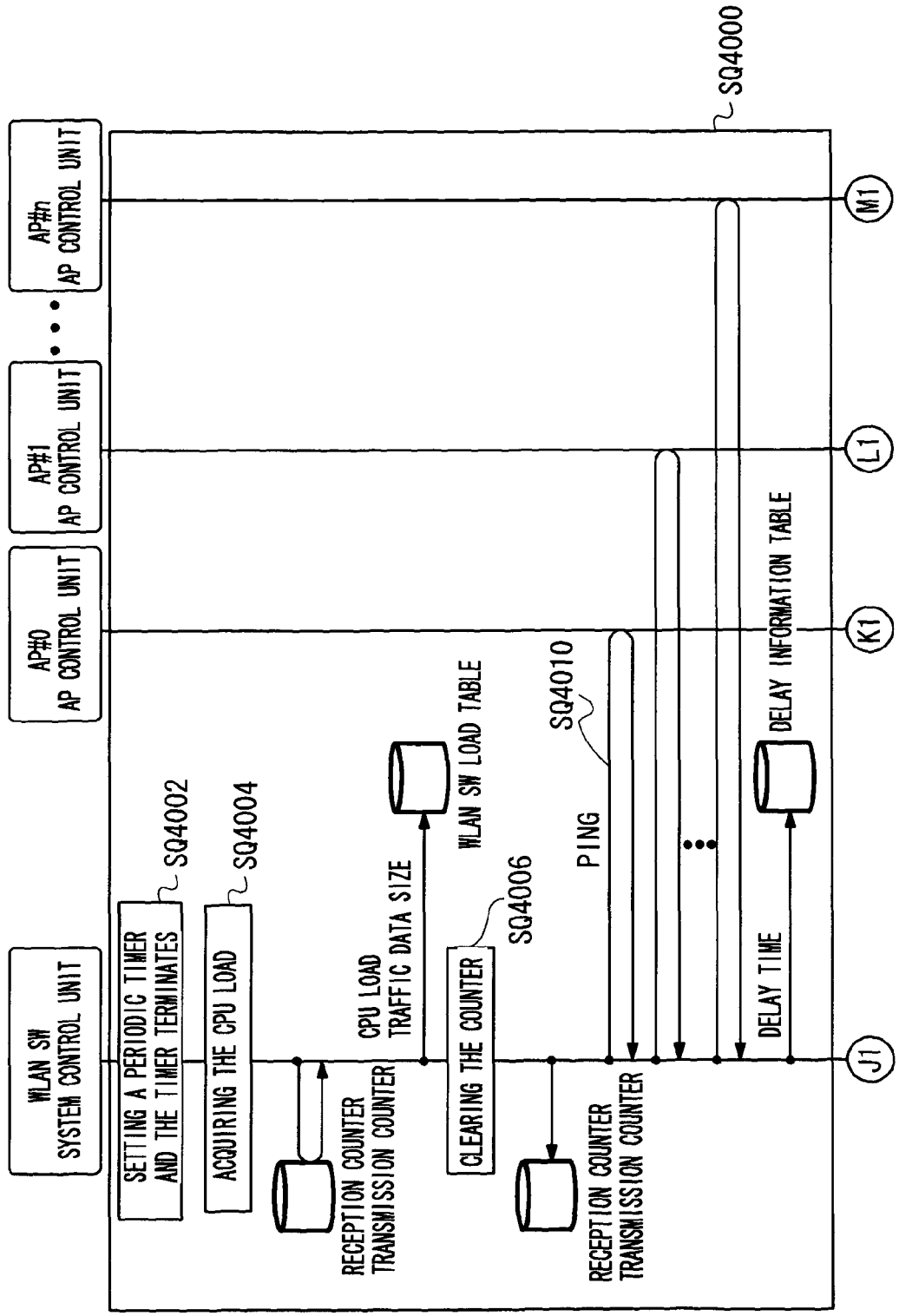
FIG. 22 is a diagram depicting an example (1) of a process of autonomously changing a mode with respect to the distributed type and the centralized type.
Figure 23:
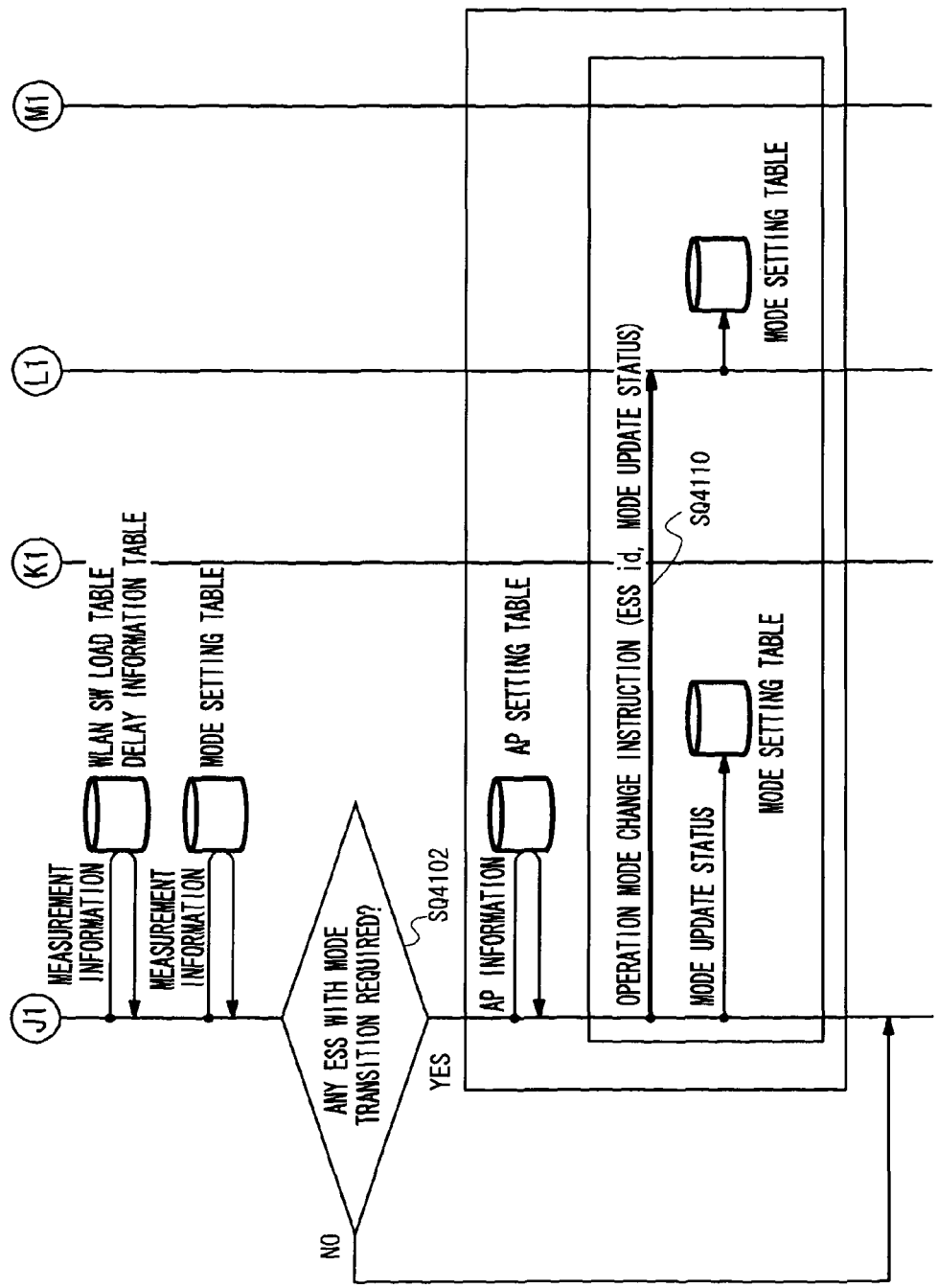
FIG. 23 is a diagram depicting an example (2) of the process of autonomously changing the mode with respect to the distributed type and the centralized type.

FIGS. 22 and 23 are diagrams each depicting an example of autonomously changing the mode with respect to the distributed type and the centralized type. J1, K1, L1, M1 in FIG. 22 connect with J1, K1, L1, M1 in FIG. 23, respectively.

The system control unit 220 of the WLAN SW 200 monitors statistic information (the CPU load, a traffic data size and a delay of the transmission between the WLAN SW and the AP) of the system at all times.

The system control unit 220 periodically acquires the statistic information by use of a periodic timer by way of one example of the monitoring method thereof. Namely, the system control unit 220 sets the periodic timer and, when the timer terminates (FIG. 22: SQ4002), acquires the CPU load (the activity ratio of the CPU) at that point of time (SQ4004). Further, the system control unit 220 acquires a packet traffic data size (an accumulation value) from the reception counter 205 and the transmission counter 207, and stores these respective values in a WLAN SW load table 232. Thereafter, the values of the reception counter 205 and the transmission counter 207 are cleared (SQ4006). Further, the system control unit 220 executes the PING process for all of the APs set in the AP setting table 238 (SQ4010), then measures the transmission delay time on the AP basis, and stores a measured result in the delay information table 234. The WLAN SW 200 periodically performs the measurement described above (SQ4000) a predetermined number of times.

FIG. 24 is a diagram depicting an example of a structure of the WLAN SW load table. The WLAN SW load table 232 includes a structure capable of retaining a predetermined number of measurement records, and measurement items of the WLAN SW load are the CPU activity ratio and the traffic data size. The load information of the WLAN SW is not limited to these items. The system control unit 220 measures the CPU activity ratio and the traffic data size at each measurement timing, and stores the measured values in the WLAN SW load table 232. As for the traffic data size, the system control unit 220 adds up the traffic data size stored in the reception counter 205 and the traffic data size stored in the transmission counter 207, and an added value is stored. The storage of the information is conducted such that the measurement starts from a measurement No. #0, then, when reaching a predetermined number, the measurement returns to #0, and the measured values are stored by overwriting, which process is repeated. The storage of the predetermined number of measurement records intends to calculate an average value for a fixed period of time.

FIG. 25 is a diagram depicting an example of a structure of the delay information table. The delay information table 234 includes a structure capable of retaining a predetermined number of measurement records on the AP basis, the measurement item is the delay time between the WLAN SW and the AP, and the delay time is measured and stored under the system control. The storage of the predetermined number of measurement records on the AP basis intends to calculate an average value for a fixed period of time.

After completing the measurement process executed the predetermined number of times, the system control unit 220 reads the information from the WLAN SW load table 232 and the delay information table 234, and calculates an average value of the data obtained by executing the process the predetermined number times in the past. Thereafter, the system control unit 220 reads, from the mode setting table 236 for every ESS with the autonomous optimization being set valid, the mode update status, the CPU load threshold values (the upper limit threshold value and the lower limit threshold value), the band threshold values (the upper limit threshold value and the lower limit threshold value) and the delay threshold values (the upper limit threshold value and the lower limit threshold value), and makes the comparison with the calculated average value. The system control unit 220 can, on the occasion of the comparison, extract and use one or plural items of information from those items of information. Further, the information for use is not limited to those items of information. Still further, the comparison is not limited to the comparison with the calculated average value but may include a comparison with a maximum value or a minimum value.

The system control unit 220, if the mode update status of the comparison target ESS is of the distributed type, the mode transits to the centralized type under the following conditions.

There are the APs equal to or larger than a predetermined number, which come under the following conditions:

[Mathematical Expression 1]

Average value of CPU activity ratios<Lower limit threshold value of CPU threshold value or Average value of traffic data sizes<Lower limit threshold value of traffic data size or Average value of delay time<Upper limit threshold value of delay Further, the system control unit 220, if the mode update status of the comparison target ESS is of the distributed type, gets the mode to transition to the distributed type under the following conditions. There are the APs equal to or larger than a predetermined number, which come under the following conditions:

[Mathematical Expression 2]

Average value of CPU activity ratios<Upper limit threshold value of CPU threshold value or Average value of traffic data sizes<Upper limit threshold value of traffic data size or Average value of delay time<Lower limit threshold value of delay If a difference between the upper limit threshold value and the lower limit threshold value is 0 or small, the operation mode might be frequently changed. It is preferable for preventing the operation mode from being frequently changed that the difference between the upper limit threshold value and the lower limit threshold value be set large.

As a result of the comparison, when there exists the ESS required to transition in its status (FIG. 23: SQ4102; YES), the system control unit 220 reads the AP with the ESS (ESS id) being set in this ESS from the AP setting table 238, and instructs the AP to change the operation mode (SQ4110). The instruction of changing the operation mode includes using the ESS (ESS id) and the post-changing operation mode. The AP 300 changes the operation mode according to the operation mode change instruction. The system control unit 220 updates the mode update status in the mode setting table.

Further, the system control unit 220 loops back to SQ4002 and again sets the periodic timer.

As a result of the comparison, when there exists none of the ESS required to transition in its status (SQ4102; NO), the system control unit 220 loops back to SQ4002 and again sets the periodic timer.

Operation and Effect in Embodiment

The ESS exemplified in the embodiment is set as the basis, and, owing to the independency of the operation mode, the single system can organize the operation mode optimal to the service requirement by separating the plurality of services having the different service requirements on the ESS basis. Further, the optimal system in the operation modes between the distributed integration architecture and the centralized integration architecture can be selected autonomously and automatically on the ESS basis, depending on the setting, and the best environment under the situation thereof can be always provided for every service.

Thus, the communication environment optimal to all of the variety of services can be provided by the single system, and consequently the costs for introducing the system can be remarkably reduced, and there is a high effect in facilitating the operation management in terms of enabling the optimal mode to be selected automatically. From this point, according to the embodiment, it is feasible to provide a solution effective in the wireless LAN system which is said to be large in the system introduction costs and intricate in the operation management.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A base station device connected to a base station management device comprising:
    a first receiver which receives transmission data and a control signal from a wireless terminal;
    a storage which stores with a centralized mode for setting a transmission destination of the transmission data in the base station management device, or a distributed mode for setting the transmission destination of the transmission data in none of the base station management device; and
    a transmitter which transmits the transmission data and the control signal,
    wherein the transmitter, when the mode set in the storage is the centralized mode, transmits the control signal received from the wireless terminal and the transmission data received from the wireless terminal to the base station management device, and, when the mode set in the storage is the distributed mode, transmits the control signal received from the wireless terminal to the base station management device and transmits the transmission data received from the wireless terminal toward a destination device of the transmission data without passing through the base station management device.

2. The base station device according to claim 1, further comprising a second receiver which receives a mode setting instruction from the base station management device,
    wherein the storage stores, based on the mode setting instruction, the centralized mode or the distributed mode.

3. The base station device according to claim 1, wherein the storage stores the centralized mode or the distributed mode corresponding to an identifier to identify a wireless network to which the wireless terminal belongs.

4. The base station device according to claim 1, further comprising a second receiver which receives, from the base station management device, a mode setting instruction corresponding to an identifier to identify the wireless network to which the wireless terminal belongs,
    wherein the storage stores the centralized mode or the distributed mode corresponding to the identifier on the basis of the mode setting instruction.

5. A base station management device connected to a base station device, comprising:
    a measure which measures a load of the base station management device which contains a CPU load of the base station management device, a traffic data size, and a delay of a transmission between the base station management device and the base station device;
    a mode setter which manages a mode of the base station device, i.e., a centralized mode for setting a transmission destination of transmission data in the base station device to the base station management device or a distributed mode for setting the transmission destination of the transmission data in the base station device to none of the base station management device, and which manages a threshold value of a load of the base station management device determining a change of the mode;
    a determiner which determines whether the change of the mode is required or not by comparing the measured value measured by the measure with the threshold value of the load of the base station management device, which is managed by the mode setter;

a transmitter which transmits, when the determiner determines that the change of the mode is required, a mode setting instruction of instructing a post-changing mode to the base station; and a receiver which receives control signal and transmission data from the base station device when the mode of the base station device is the centralized mode, and which receives control signal from the base station device when the mode of the base station device is the distributed mode.

6. The base station management device according to claim 5, wherein the mode setter manages the mode and the threshold value corresponding to an identifier to identify a wireless network to which a wireless terminal performing communications with the base station device belongs.

7. The base station management device according to claim 6, wherein the determiner determines whether the change of the mode is required or not by comparing a measured value measured by the measure with the threshold value of the load of the base station management device, which is managed by the mode-setter.

8. A base station management system comprising a base station management device and a base station device, the base station management device including:

a measure which measures a load of the base station management device which contains a CPU load of the base station management device, a traffic data size, and a delay of a transmission between the base station management device and the base station device;

a mode setter which manages a mode of the base station device, i.e., a centralized mode for setting a transmission destination of transmission data in the base station device to the base station management device or a distributed mode for setting the transmission destination of the transmission data in the base station device to none of the base station management device, and which manages a threshold value of a load of the base station management device determining a change of the mode;

a determiner which determines whether the change of the mode is required or not by comparing the measured value measured by the measure with the threshold value of the load of the base station management device, which is managed by the mode setter; and a transmitter which transmits, when the determiner determines that the change of the mode is required, a mode setting instruction of instructing a post-changing mode to the base station, the base station device including:

a first receiver which receives transmission data and a control signal from a wireless terminal;

a storage which stores the centralized mode or the distributed mode;

a second receiver which receives the mode setting instruction from the base station management device; and a transmitter which transmits the transmission data and the control signal, wherein the storage stores a centralized mode or a distributed mode based on the mode setting instruction, the transmitter of the base station device transmits the control signal to the base station management device, and the transmitter of the base station device transmits, when the mode set in the storage is the centralized mode, the transmission data received from the wireless terminal to the base station management device, and transmits, when the mode set in the storage is the distributed mode, the transmission data received from the wireless terminal to a destination device of the transmission data without passing through the base station management device.

* * * * *